(12) United States Patent
Takubo

(10) Patent No.: US 7,908,073 B2
(45) Date of Patent: Mar. 15, 2011

(54) CONTROL APPARATUS FOR AN INTERNAL COMBUSTION ENGINE

(75) Inventor: Hideki Takubo, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 226 days.

(21) Appl. No.: 12/266,082

(22) Filed: Nov. 6, 2008

(65) Prior Publication Data
US 2009/0306879 A1 Dec. 10, 2009

(30) Foreign Application Priority Data
Jun. 9, 2008 (JP) ................................. 2008-150251

(51) Int. Cl.
B60T 7/12 (2006.01)
(52) U.S. Cl. ......................................... 701/103; 123/703
(58) Field of Classification Search .................. 701/103, 701/104, 109, 114, 115; 123/434, 672, 703, 123/704, 695, 575, 406.31
See application file for complete search history.

(56) References Cited

U.S. PATENT DOCUMENTS

| 6,941,936 B2 * | 9/2005 | Yasui et al. ................... 123/674 |
| 7,089,920 B2 * | 8/2006 | Nakoji et al. ................. 123/520 |
| 7,159,623 B1 | 1/2007 | Carr et al. |
| 7,162,862 B2 * | 1/2007 | Nagai et al. ..................... 60/285 |
| 7,171,960 B1 * | 2/2007 | Hagari ........................... 123/698 |
| 7,650,874 B2 * | 1/2010 | Takubo .......................... 123/434 |
| 7,654,252 B2 * | 2/2010 | Kato et al. ..................... 123/674 |
| 2005/0139491 A1 * | 6/2005 | Ohkuma ......................... 205/782 |
| 2010/0031941 A1 * | 2/2010 | Hokuto .......................... 123/575 |
| 2010/0077729 A1 * | 4/2010 | Endo ............................... 60/276 |

FOREIGN PATENT DOCUMENTS

| JP | 03-185349 A | 8/1991 |
| JP | 06-093908 A | 4/1994 |
| JP | 2003-120363 A | 4/2003 |
| JP | 2004-278449 A | 10/2004 |
| JP | 2004-285972 A | 10/2004 |
| JP | 2008-019830 A | 1/2008 |

* cited by examiner

Primary Examiner — John T Kwon
(74) Attorney, Agent, or Firm — Sughrue Mion, PLLC

(57) ABSTRACT

A control apparatus for an internal combustion engine is provided which, even when a starting time of an alcohol concentration change varies, can accurately detect a starting time of an alcohol concentration estimation, and set a concentration estimation time matched to the behavior of the concentration change after determination of the start of the concentration change. An air fuel ratio correction amount calculation unit calculates an air fuel ratio correction amount based on an air fuel ratio detected by a sensor. An estimation permission determination unit determines that a starting condition for concentration estimation holds, when the correction amount becomes out of a predetermined range, and sets a permission time for concentration estimation in accordance with an accumulated amount of fuel injected after the starting condition for concentration estimation holds. A concentration estimation unit calculates an estimated concentration value based on the correction amount during permission of the concentration estimation.

10 Claims, 9 Drawing Sheets

CONTROL APPARATUS FOR AN INTERNAL COMBUSTION ENGINE

BACKGROUND OF THE INVENTION

1. Field of the Invention

The present invention relates to a control apparatus for an internal combustion engine that can be run even with a blended fuel of various compositions of alcohol (single component) and gasoline. In particular, the invention relates to a technique in which a concentration of a single component is estimated based on an air fuel ratio correction component, and an amount of fuel to be injected is optimized by the use of the estimated concentration value of the component.

2. Description of the Related Art

In recent years, motor vehicles or automobiles called FFV (flexible fuel vehicle) have been developed which become able to run even with a blended fuel of various compositions of alcohol and gasoline, other than with gasoline alone.

In this case, alcohol has a content of C (carbon) atoms differing from that of ordinary gasoline (blended fuel), so when a blended fuel of alcohol and gasoline is supplied to an internal combustion engine used for FFV, it is necessary to adjust the amount of fuel to be injected according to an alcohol concentration in the fuel.

In such a kind of FFV, there has conventionally been proposed, as an internal combustion engine control apparatus for estimating an alcohol concentration in fuel, a technique that estimates an alcohol concentration from a correlation between an air fuel ratio feedback correction coefficient, which is calculated based on an air fuel ratio AF in an exhaust gas derived from an air fuel ratio sensor, and the alcohol concentration (see, for example, a first patent document: Japanese patent application laid-open No. 2004-245097 and a second patent document: U.S. Pat. No. 6,016,796).

In general, when an alcohol concentration in a blended fuel is changed by refueling, there will be a transportation delay until the blended fuel in a fuel tank with its alcohol concentration thus changed arrives at an injector that supplies the fuel to an internal combustion engine, and this delay becomes larger in a returnless fuel supply system.

In a general returnless fuel supply system as shown in a block diagram of FIG. 12, fuel in a fuel tank 20 is sent to a fuel supply pipe 25 through a fuel pump 22 and a pressure regulator 23, and thence is further introduced into a delivery pipe 26, so that it is injected from injectors 21 to an internal combustion engine at appropriate injection timing.

At this time, fuel in a downstream side of the pressure regulator 23 advances only by an amount of fuel injected by the injectors, so a delay in the change of the alcohol concentration is large, but in an upstream of the pressure regulator 23, fuel is always circulated in the following path or route, i.e., the fuel tank 20→the fuel pump 22→the pressure regulator 23→the fuel tank 20, so the delay of the alcohol concentration change is very small.

Therefore, the delay of the alcohol concentration change from the fuel in the fuel tank 20 to the fuel in the injectors 21 is represented by a fuel transportation delay of the fuel supply pipe 25 and a fuel transportation delay of the delivery pipe 26 at the downstream side of the pressure regulator 23.

Here, the delay in the relatively long thin fuel supply pipe 25 becomes a dead time delay, but the delay in the relatively thick fuel supply delivery pipe 26 becomes a first order delay because fuel mixes in the delivery pipe 26.

These dead time delay and first order delay change in inverse proportion to the flow rate of fuel, and are represented, if organized according to an accumulated or integrated amount of injection, by a predetermined function.

FIG. 13 is a waveform chart that shows the delay of the alcohol concentration change comprising a predetermined function. The axis of abscissa represents the accumulated amount of fuel injected, and the axis of ordinate represents the alcohol concentrations in the fuel tank 20 (upper row) and in the injectors 21 (lower row), respectively.

When fuel of a high alcohol concentration is supplied, upon refueling, to the fuel tank 20 with the accumulated amount of fuel injected (hereinafter referred also to the "accumulated amount of injection fuel") is in a state of "0" in FIG. 13, the alcohol concentration (upper row) in the fuel tank 20 becomes high.

On the other hand, the alcohol concentration (lower row) in the injectors 21 changes with a total delay comprising a dead time Q1 and a first order delay Q2, and the period of this delay (=Q1+Q2) becomes a predetermined accumulated amount of fuel injected.

In the conventional apparatuses as described in the above-mentioned first patent document and the second patent document, a period, after the end of the dead time Q1, in which the alcohol concentration in fuel is changed by the first order delay Q2, is set based on the accumulated amount of injection after refueling, and the alcohol concentration in fuel is estimated in the period thus set.

However, according to the above-mentioned conventional apparatuses, if the dead time Q1 from after refueling until the start of the alcohol concentration change varies, an error will occur in the estimation of the alcohol concentration.

That is, when an error occurs in the setting of the starting time of the alcohol concentration estimation, an appropriate alcohol concentration estimation period and an appropriate update gain of the estimated value can not be set so as to meet the alcohol concentration change behavior of the first order delay Q2, so an error occurs in the alcohol concentration estimation.

In addition, the rate or speed of the alcohol concentration change becomes the largest just after the starting of the alcohol concentration change in view of the behavior of the first order delay Q2, so in case where an error occurs in the starting time of the first order delay Q2, the error in the alcohol concentration estimation becomes large, resulting in an adverse influence on a wide range of internal combustion engine control (e.g., fuel control, ignition control, etc.) in which control constants or parameters are changed in accordance with the estimated value of the alcohol concentration.

Further, since such a variation in the starting time of the alcohol concentration change will be generated due to various factors, it is difficult to set appropriate control constants beforehand in consideration of a variation width or range of the alcohol concentration change starting time.

As a variation factor for the starting time of the alcohol concentration change, there is enumerated, for example, a case in which during the time when the internal combustion engine is in a stopped state, such as during refueling or the like, the fuel in the fuel supply pipe 25 and the delivery pipe 26 is forced to return to the fuel tank 20 under the action of vaporized fuel generated due to the heat transmitted from the internal combustion engine.

In addition, as other variation factors, the following cases are exemplified. That is, a first case is that during the time when the internal combustion engine is stopped for an extended period of time, the fuel in the fuel supply pipe 25 and the delivery pipe 26 returns to the fuel tank 20; a second case is that an error occurs in the calculation of the accumulated amount of injected fuel after refueling; a third case is that the calculated value of the accumulated amount of injected fuel after refueling is reset during the time until the following refueling; a fourth case is that the fuel supply pipe 25 or the delivery pipe 26 or both of them are replaced with a pipe(s) of a different shape(s); a fifth case is that fuel comes out from the fuel pump 22 and/or the fuel tank 20 at the time of the replacement of the fuel supply pipe 25 and/or the delivery pipe 26; and so on.

In the conventional control apparatuses for an internal combustion engine, if the dead time Q1 from after refueling until the start of the alcohol concentration change varies, an error will occur in the estimation of the alcohol concentration, as a result of which there has been a problem that an adverse influence is exerted on the fuel control, etc., which is effected based on the estimated value of the alcohol concentration.

SUMMARY OF THE INVENTION

Accordingly, the present invention is intended to solve the problems as referred to above, and has for its object to obtain a control apparatus for an internal combustion engine which, by determining the starting time of an alcohol concentration change from a change in an air fuel ratio correction amount, is capable of detecting the starting time of processing of estimating an alcohol concentration with high accuracy even when the starting time of the alcohol concentration change is varied due to vapor (fuel vaporization) or the like generated during the time when the internal combustion engine is in a stopped state, and at the same time, of setting an appropriate concentration estimation period suited or matched to a delay concentration change behavior like a first order delay after the start of the concentration estimation processing, thereby to improve the accuracy of the concentration estimation value for the optimization of the control.

Bearing the above object in mind, a control apparatus for an internal combustion engine according to the present invention includes: a fuel supply device that supplies fuel in a fuel tank to the internal combustion engine; an air fuel ratio detection unit that is arranged in an exhaust system of the internal combustion engine for detecting an air fuel ratio in an exhaust gas from the internal combustion engine; an air fuel ratio correction amount calculation unit that calculates an amount of air fuel ratio correction for correcting an amount of injection fuel supplied to the internal combustion engine based on the air fuel ratio detected by the air fuel ratio detection unit; an estimation permission determination unit that makes a determination that a starting condition for estimation of a concentration of the fuel holds when the air fuel ratio correction amount becomes out of a range of a predetermined threshold, and sets a permission time for the concentration estimation in accordance with a first accumulated amount of injection fuel which is obtained by summing the amount of injection fuel supplied to the internal combustion engine after the starting condition for concentration estimation holds; a concentration estimation unit that calculates the estimated value of a concentration of a single component of the fuel based on the air fuel ratio correction amount during the time when the concentration estimation is permitted by the estimation permission determination unit; and a fuel injection amount calculation unit that corrects the amount of fuel to be injected in accordance with the air fuel ratio correction amount and the estimated concentration value.

According to the present invention, it is possible to detect the starting time of the alcohol concentration estimation with high accuracy, and to set an appropriate alcohol concentration estimation period suited or matched to an alcohol concentration change behavior like a first order delay after the start of the alcohol concentration estimation. As a result, the accuracy of the estimated value of the alcohol concentration can be improved, thereby making it possible to enhance control precision.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Hereinafter, a preferred embodiment of the present invention will be described in detail while referring to the accompanying drawings.

Embodiment 1

Figure 1:
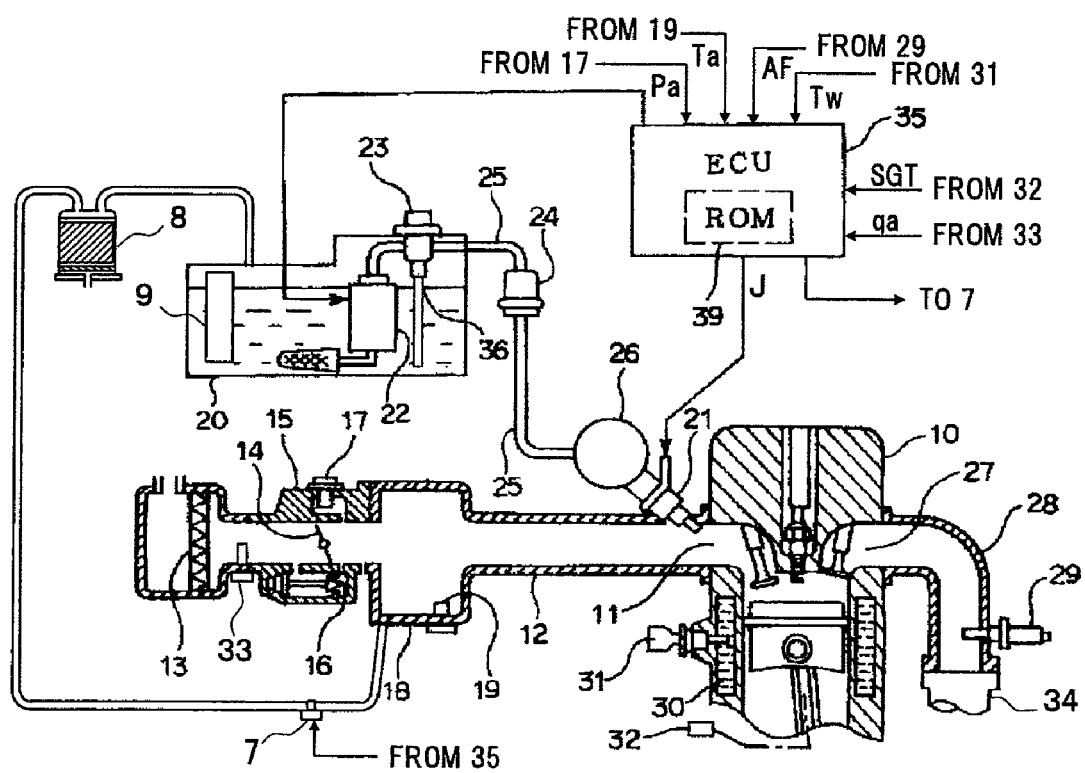
FIG. 1 is a block diagram schematically showing a control apparatus for an internal combustion engine according to a first embodiment of the present invention.

Referring to the drawings and first to FIG. 1, there is schematically shown a block diagram of a control apparatus for an internal combustion engine according to a first embodiment of the present invention, wherein the internal combustion engine using a fuel containing alcohol is illustrated.

In FIG. 1, an intake pipe 12 is connected through an intake manifold to individual intake ports 11 of cylinders (only one being illustrated for the sake of simplicity) of an engine 10 that is an internal combustion engine. An air cleaner 13 is arranged at the most upstream portion of the intake pipe 12. An air flow meter 33 for detecting an amount of air qa sucked to the engine 10 is mounted on the intake pipe 12 at a location downstream of the air cleaner 13, and a throttle valve 14 is arranged in the intake pipe 12 at a location downstream of the air flow meter 33.

In a throttle body 15 in which the throttle valve 14 is received, there are arranged an idle speed control valve 16 for adjusting an amount of intake air bypassing the throttle valve 14, and an intake pipe pressure sensor 17 for detecting an intake pipe pressure Pa in the intake pipe 12.

A surge tank 18 is arranged to be connected to the intake pipe 12 at a location downstream of the throttle body 15, and an intake air temperature sensor 19 for detecting the temperature Ta of intake air is arranged in the surge tank 18.

In addition, in the vicinity of the intake ports 11 of the individual cylinders, there are arranged a plurality of fuel injection valves (injectors) 21 that serve to inject the fuel supplied from the fuel tank 20 into the corresponding cylinders.

Fuel in the fuel tank 20 is drawn up by a fuel pump 22. and is sent to a fuel supply pipe 25, from which it is further sent to a delivery pipe 26 for supplying the fuel to the injectors 21 while passing through a pressure regulator 23 and a fuel filter 24, so that it is distributed from the delivery pipe 26 to the injectors 21 of the respective cylinders.

The pressure regulator 23 has a back pressure chamber defined therein which is opened to the ambient atmosphere, and a surplus of the fuel sent from the fuel pump 22 to the pressure regulator 23 is returned from a fuel return opening 36 of the pressure regulator 23 into the fuel tank 20.

The delivery pipe 26 and the injectors 21 together constitute a fuel supply device that serves to supply fuel to the engine 10. In addition, the fuel supply pipe 25 including the pressure regulator 23 and the fuel filter 24 constitutes a fuel supply passage for supplying fuel from the fuel tank 20 to the injectors 21 (fuel supply device).

A fuel supply system comprising the fuel supply passage and the fuel supply device as shown in FIG. 1 constitutes a returnless fuel supply system in which a return pipe for returning surplus fuel from the delivery pipe 26 into the fuel tank 20 is abolished, and the fuel supply pipe 25 terminates at the delivery pipe 26.

In addition, a fuel level gage 9 for detecting the liquid level of fuel in the fuel tank 20 is installed in the fuel tank 20. A pipe having a canister 8 and a valve 7 (purge opening and closing unit) is arranged between the fuel tank 20 and the surge tank 18, so that vaporized fuel in the fuel tank 20 can be adsorbed by the canister 8 and the adsorbed fuel is purged from the canister 8 into the intake pipe 12, as necessary.

A water temperature sensor 31 for detecting the temperature Tw of engine cooling water is mounted on a water jacket 30 that serves to cool the engine 10. Further, the rotational speed (or the number of revolutions per minute) Ne of the engine 10 is detected by the frequency of a pulse signal SGT which is output from a crank angle sensor 32 at every predetermined crank angle.

Detection signals (operating state information) of a variety of kinds of sensors arranged in the surroundings of the engine 10 are input to an engine control unit 35 (hereinafter referred to as an "ECU") comprising a microcomputer. The ECU 35 has a backup RAM or an EEPROM (not shown) that stores data used for various calculation processing to be described later, and a ROM 39 in which arithmetic calculation or operation control programs are stored.

The injectors 21 are operated to inject and supply fuel to the intake air in the intake pipe 12 by means of an injection command signal J from the ECU 35 in such a manner that the ratio of air and fuel of a mixture to be supplied to the individual cylinders becomes a predetermined air fuel ratio corresponding to the operating condition of the engine 10.

On the other hand, an oxygen concentration sensor (air fuel ratio detection unit) 29 for detecting the air fuel ratio AF of an exhaust gas discharged from the engine 10 is mounted on an exhaust pipe 28 that is connected through an exhaust manifold to individual exhaust ports 27 (only one being illustrated for the sake of simplicity) of the cylinders of the engine 10. A three-way catalyst (hereinafter referred to simply as a "catalyst") 34 for purifying the exhaust gas is arranged to be connected to the exhaust pipe 28 at a location downstream of the oxygen concentration sensor 29. When the air fuel ratio lies within a so-called specific window that is defined around a stoichiometric air fuel ratio, the three-way catalyst 34 is able to purify NOx, HC and CO in the exhaust gas at the same time with a maximum processing or conversion efficiency, so the ECU 35 controls the air fuel ratio of the exhaust gas in a feedback manner based on the detected air fuel ratio AF (detected value) of the exhaust gas from the oxygen concentration sensor 29 arranged at an upstream side of the three-way catalyst 34, in such a way that the air fuel ratio of the exhaust gas varies within the range of the above-mentioned specific window.

The canister 8 in the fuel supply device is connected to the surge tank 18 in the intake pipe 12 through the pipe having the valve 7, and serves to adsorb the vaporized gas generated from the fuel in the fuel tank 20. The valve 7 is opened when the vaporized gas is introduced under the control of the ECU 35, so that the vaporized gas adsorbed by the canister 8 is released into the intake pipe 12, from which it is introduced into the engine 10.

Here, it is to be noted that, as will be well known, the fuel containing alcohol has the contents of C (carbon) atoms and O (oxygen) atoms different from those of ordinary gasoline, so in order to obtain the same equivalent ratio of the alcohol-containing fuel as that of ordinary gasoline, a larger amount of fuel injection is required. Accordingly, when a blended fuel of alcohol and gasoline is supplied to the engine 10, it is necessary to adjust the amount of fuel to be injected according to an alcohol concentration AL in the fuel.

Thus, the ECU 35 estimates the alcohol concentration AL in the fuel by making use of the value of the air fuel ratio AF detected by the oxygen concentration sensor 29, and corrects the injection command signal so that the alcohol concentration AL in the fuel thus estimated is reflected on the amount of fuel to be injected. That is, the ECU 35 estimates a single component concentration (alcohol concentration AL) in the fuel by using a correction factor of the air fuel ratio feedback control based on the air fuel ratio AF.

Figure 2:
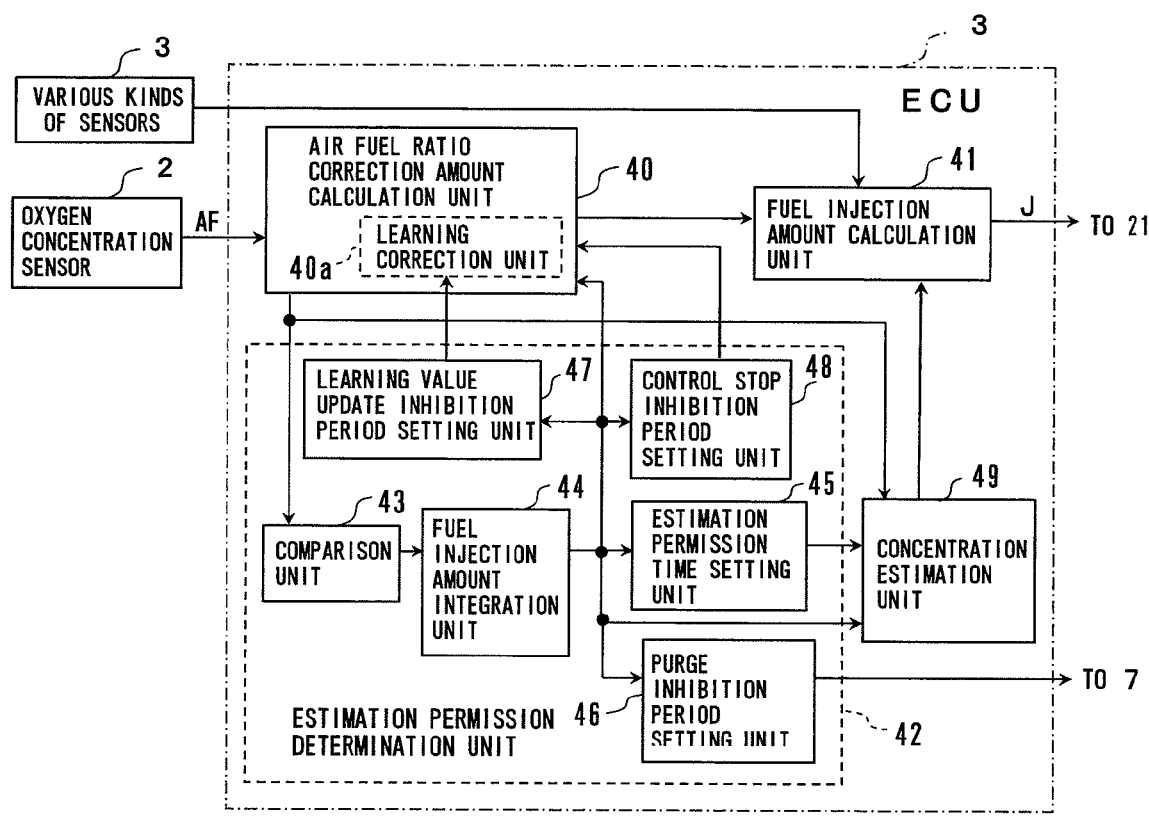
FIG. 2 is a functional block diagram showing the functional construction of an ECU (engine control unit) in the control apparatus for an internal combustion engine according to the first embodiment of the present invention.

FIG. 2 is a functional block diagram illustrating a specific construction of the ECU 35 in FIG. 1. In FIG. 2, the various kinds of sensors 38 generically mean sensors other than the oxygen concentration sensor 29, and serve to detect the operating state of the engine 10.

The ECU 35 has, as its input information, the air fuel ratio AF detected by the oxygen concentration sensor 29 and the operating state information from the various kinds of sensors 38. The ECU 35 is provided with an air fuel ratio correction amount calculation unit 40, a fuel injection amount calculation unit 41, an estimation permission determination unit 42, and a concentration estimation unit 49.

The air fuel ratio correction amount calculation unit 40 calculates an air fuel ratio correction amount to correct the amount of fuel to be injected to the engine 10 in a feedback manner based on the air fuel ratio AF detected by the oxygen concentration sensor 29.

In addition, the air fuel ratio correction amount calculation unit 40 calculates an updated learning value (learning correction coefficient KLRN) by performing filtering processing or averaging processing on the air fuel ratio correction amount (air fuel ratio correction coefficient KFB), as will be described later. Further, the air fuel ratio correction amount calculation unit 40 is provided with a learning correction unit 40a that serves to correct the amount of fuel to be injected by using the updated learning correction coefficient in parallel with the above.

The fuel injection amount calculation unit 41 corrects the amount of injection fuel based on the air fuel ratio correction amount and the learning value (the learning correction coefficient KLRN), and further corrects the amount of injection fuel in accordance with the concentration estimated value calculated by the concentration estimation unit 49.

The estimation permission determination unit 42 is provided with a comparison unit 43 that compares the air fuel ratio correction amount with a predetermined threshold KFBJD, a fuel injection amount integration unit 44 that calculates an integrated or accumulated amount of fuel injected in accordance with the comparison result of the comparison unit 43, an estimation permission time setting unit 45 that sets a permission time of concentration estimation in accordance with the accumulated amount of injected fuel, a purge inhibition period setting unit 46 that sets a purge inhibition period in accordance with the accumulated amount of injected fuel, the learning value update inhibition period setting unit 47 that sets an update inhibition period for inhibiting the update of the learning correction coefficient KLRN in accordance with the accumulated amount of injected fuel, and a control stop inhibition period setting unit 48 that sets a feedback control stop inhibition period of the air fuel ratio correction amount calculation unit 40 in accordance with the accumulated amount of injected fuel.

With such a construction, the estimation permission determination unit 42 determines based on the comparison result of the comparison unit 43 that a starting condition for estimating the alcohol concentration of fuel has held, when the air fuel ratio correction amount becomes out of the range of the predetermined threshold KFBJD (from 1−KFBJD to 1+KFBJD). The permission time of the concentration estimation is set by the estimation permission time setting unit 45 in accordance with the accumulated amount of injection fuel (first accumulated or summed amount of injection fuel) INJSUMJD obtained by the fuel injection amount integration unit 44 after the starting condition of the concentration estimation holds.

In addition, the estimation permission determination unit 42 is provided with a determination delay which serves to make a determination that the starting condition for concentration estimation holds, when an accumulated amount of injection fuel INJSUMDLY (a second accumulated amount of injection fuel), which is obtained by summing or integrating amounts of fuel injected in periods in which the air fuel ratio correction amount becomes out of a range of a predetermined threshold, reaches a second predetermined amount. Moreover, when the starting condition for concentration estimation holds, the estimation permission determination unit 42 resets the learning correction coefficient KLRN to a predetermined value. Further, the estimation permission determination unit 42 variably sets the predetermined threshold KFBJD in accordance with an accumulated amount of injection fuel INJSUMRF (a third accumulated amount of injection fuel) which is obtained by summing or integrating amounts of fuel injected after refueling of the fuel tank 20. Furthermore, the estimation permission determination unit 42 sets a period, based on which it is determined whether the starting condition for concentration estimation holds, in accordance with the third accumulated amount of injection fuel INJSUMRF.

In the estimation permission determination unit 42, the purge inhibition period setting unit 46 sets the purge inhibition period for inhibiting the valve 7 (the purge opening and closing unit) from being opened in accordance with the first accumulated amount of injection fuel INJSUMJD, and maintains the closed state of the valve 7 in the purge inhibition period. Specifically, the purge inhibition period setting unit 46 sets a period for determining whether the starting condition of concentration estimation holds as the purge inhibition period for inhibiting the opening of the purge opening and closing unit.

The learning value update inhibition period setting unit 47 sets, as the update inhibition period, the period for determining whether the starting condition for concentration estimation holds and a period in which the first accumulated amount of injection fuel INJSUMJD indicates a value equal to or less than a first predetermined amount.

In addition, the control stop inhibition period setting unit 48 sets a control stop inhibition period for not stopping the calculation of the air fuel ratio correction amount in the air fuel ratio correction amount calculation unit 40 (i.e., inhibiting open-loop control) in accordance with the first accumulated amount of injection fuel INJSUMJD.

The concentration estimation unit 49 calculates the estimated concentration value of the single component (alcohol) of fuel based on the air fuel ratio correction amount during the time when the concentration estimation is permitted by the estimation permission determination unit 42. More specifically, the concentration estimation unit 49 updates the estimated concentration value based on the air fuel ratio correction amount and a control constant, and variably sets the control constant in accordance with the first accumulated amount of injection fuel INJSUMJD.

Next, specific reference will be made to a calculation routine for air fuel flow ratio correction coefficient KFB used for air fuel ratio feedback control according to the first embodiment of the present invention while referring to a flow chart of FIG. 3 together with FIG. 1 and FIG. 2. Here, note that symbols Y (Yes) and N (No) are attached to branched portions, respectively, from each determination processing in FIG. 3. The control or calculation routine of FIG. 3 is executed by the ECU 35 at every predetermined time (e.g., 5 msec).

Figure 3:
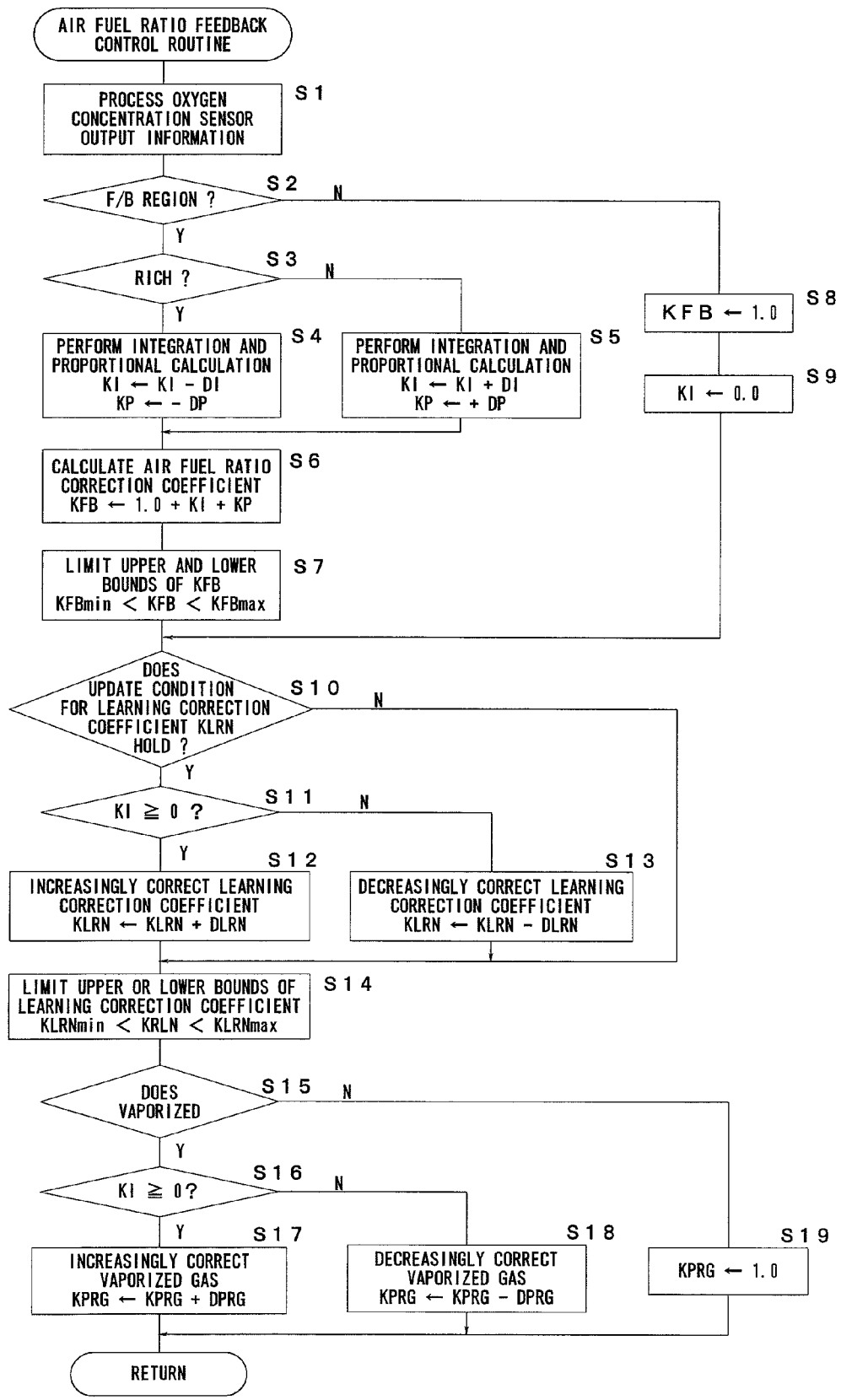
FIG. 3 is a flow chart illustrating an air fuel ratio feedback control routine according to the first embodiment of the present invention.

In FIG. 3, first of all, the fuel injection amount calculation unit 41 in the ECU 35 takes in an output voltage V1 (corresponding to the air fuel ratio AF) of the oxygen concentration sensor 29 by converting it from analog into digital form (step S1), and determines whether a closed-loop (feedback) condition for the air fuel ratio based on the detected value of the upstream oxygen sensor 29 holds (step S2).

For example, at the time when the air fuel ratio control condition is other than stoichiometric air fuel ratio control, or when the oxygen concentration sensor 29 is in an inactive state, or when the oxygen concentration sensor 29 is in a failure, or the like, it is in either case determined that the closed-loop condition does not hold, whereas in other cases, it is determined that the closed-loop condition holds.

Here, the following conditions are given, for example, as the air fuel ratio control condition: during a start-up operation of the engine 10; during air fuel ratio enriching control at the time when the cooling water temperature Tw is low; during air fuel ratio enriching control where the output power of the engine 10 is increased under high load; during air fuel ratio leaning control for improved fuel mileage; during air fuel ratio leaning control after engine starting; during the engine 10 is in a fuel cut-off operation; and so on.

When it is determined in step S2 that the closed-loop condition does not hold (that is, No), the air fuel ratio correction coefficient KFB is set to "1.0" (step S8), and an integral calculation value KI is reset to "0.0" (step S9), after which the control process proceeds to step S10 (to be described later).

On the other hand, when it is determined in step S2 that the closed-loop condition holds (that is, Yes), feedback control (steps S3 through S7) is carried out according to a proportional and integral operation using a proportional calculation value KP and the integral calculation value KI.

First of all, a comparison is made between the output voltage V1 and a target voltage VF1 of the oxygen concentration sensor 29, so that it is determined whether the air fuel ration of the mixture is in a rich state or a lean state (step S3).

When the output voltage V1 is equal to or higher than the target voltage VF1 and the air fuel ratio AF (the detected value of the oxygen concentration sensor 29) is determined to be rich (that is, Yes), the integral calculation value KI is decreased by a predetermined gain DI so as to decrease the amount of fuel to be injected, and at the same time the proportional calculation value KP is set to a negative gain "–DP", as shown in the following expressions (1) and (2) (step S4).

$$KI \leftarrow KI-DI \quad (1)$$

$$KP \leftarrow -DP \quad (2)$$

In the above expressions (1) and (2), the gain DI of the integral calculation value KI and the gain DP of the proportional calculation value KP are set to appropriate values, respectively, for each operating condition of the engine 10 in such a manner that good feedback performance can be obtained.

On the other hand, when in step S3, V1 is smaller than VF1 and the air fuel ratio AF is determined to be lean (that is, Yes), the integral calculation value KI is increased by the predetermined gain DI so as to increase the amount of fuel to be injected, and at the same time the proportional calculation value KP is set to a positive gain "+DP", as shown in the following expressions (3) and (4) (step S5).

$$KI \leftarrow KI+DI \quad (3)$$

$$KP \leftarrow +DP \quad (4)$$

Subsequently, the air fuel ratio correction coefficient KFB is calculated by using the integral calculation value KI and the proportional calculation value KP set in step S4 or S5, as shown in the following expression (5) (step S6).

$$KFB \leftarrow 1.0+KI+KP \quad (5)$$

In addition, bounds pair (upper and lower limit) limiting processing is applied to the air fuel ratio correction coefficient KFB by using a lower limit value KFBmin and an upper limit value KFBmax, as shown in the following expression (6) (step S7).

$$KFBmin<KFB<KFBmax \quad (6)$$

By means of the above-mentioned bounds pair limiting processing, an excessively large fuel operation can be prevented, thereby making it possible to prevent deterioration in drivability, etc.

Figure 5:
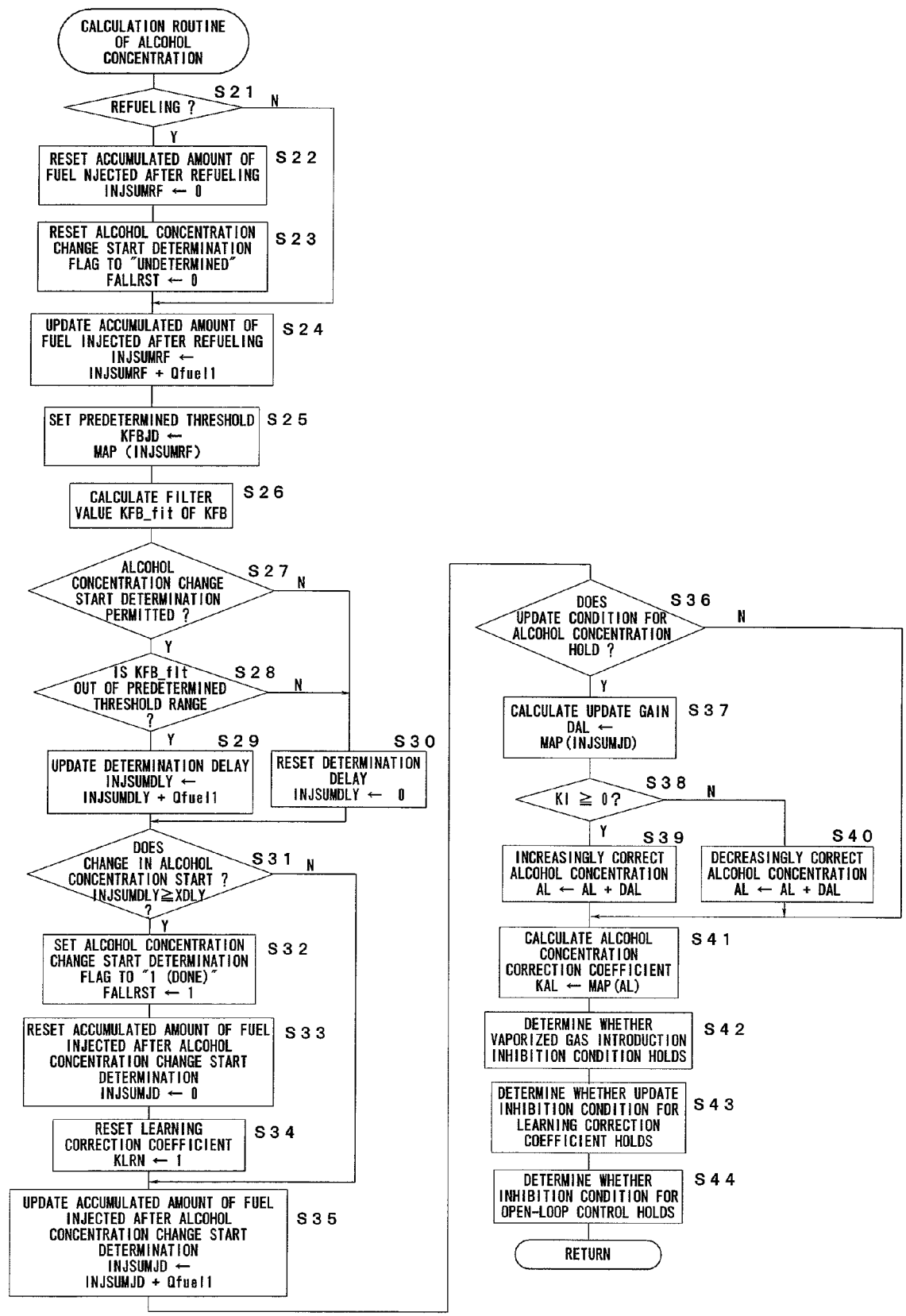
FIG. 5 is a flow chart illustrating a routine for estimating an alcohol concentration according to the first embodiment of the present invention.

Then, in step S10 to step S14, a learning correction coefficient KLRN, which is a learned value of the air fuel ratio correction coefficient KFB is calculated (i.e., increased or decreased). An initial value of the learning correction coefficient KLRN is set to "1" by means of reset processing (step S34), as shown in FIG. 5 (to be described later).

The learning control of the air fuel ratio correction coefficient KFB is performed to compensate for aging and production variations of the fuel supply device (e.g., a change in the injection amount characteristics of the injectors 21, an error in the amount of intake air qa detected by the air flow meter 33, etc.).

Here, note that in case where there is no characteristic change of the injectors 21, the center of the air fuel ratio correction coefficient KFB is designed to be equal to 1.0, but if a characteristic change occurs, there will be a deviation or shift from "1.0". The learning control serves to compensate for this deviation from "1.0" of the air fuel ratio correction coefficient KFB by means of the learning correction coefficient KLRN so as to keep the center of the air fuel ratio correction coefficient KFB to 1.0.

First of all, it is determined whether a condition of updating the learning correction coefficient KLRN is satisfied (step S10), and when it is determined that the update permission condition for the learning correction coefficient KLRN is not satisfied and hence an update inhibition condition holds (that is, No), the control process proceeds directly to step S14.

Here, note that such an update permission condition includes "during air fuel ratio feedback control", "the condition for the engine cooling water temperature", "at the time when the vaporized gas is not being introduced", "at the time when an alcohol concentration of fuel is not changing", etc.

In addition, by referring to an update permission flag FFBLRN (to be described later), the condition of the alcohol concentration AL being not changing determines an update permission (i.e., updating the learning correction coefficient KLRN is permitted) when the update permission flag FFBLRN is "1".

When it is determined in step S10 that the update permission condition holds (i.e., is satisfied) (that is, No), it is then determined whether the integral calculation value KI is larger than "0" (step S11).

When in step S11 it is determined as $KI \geq 0$ (that is, Yes), it is indicated that the amount of fuel to be injected by the fuel supply device is decreasing, so the learning correction coefficient KLRN is increased by a predetermined update gain DLRN, as shown in the following expression (7) (step S12), and the control process proceeds to step S14.

$$KLRN \leftarrow KLRN+DLRN \quad (7)$$

When in step S11 it is determined as KI<0 (that is, No), the learning correction coefficient KLRN is decreased by the predetermined update gain DLRN, as shown in the following expression (8) (step S13), and the control process proceeds to step S14.

$$KLRN \leftarrow KLRN-DLRN \quad (8)$$

In the above expressions (7) and (8), the update gain DLRN is set to be sufficiently smaller than the integral calculation update gain DI, so that the change rate of the learning correction coefficient KLRN is prevented from becoming too large as compared with the air fuel ratio correction coefficient KFB.

In addition, the learning correction coefficient KLRN is held for each of engine operating conditions which are divided or delimited by the rotational speed or load of the engine 10, and it is obtained or calculated in such a manner that a tendency difference in the characteristic variation due to the engine operating conditions can be absorbed.

The learning correction coefficient KLRN is corrected to increase or decrease by using the update gain DLRN in steps S10 through S13, but the learning correction coefficient KLRN updated by applying filter processing or averaging processing to the air fuel ratio correction amount KFB by the use of other well-known calculation processing may be calculated.

Subsequently, the bounds pair limiting processing is applied to the learning correction coefficient KLRN by using a lower bound (limit) value KLRNmin and an upper bound (limit) value KLRNmax, as shown in the following expression (9) (step S14).

$$KLRNmin < KLRN < KLRNmax \quad (9)$$

By performing the bound pair limiting processing as shown in the above expression (9), an excessively large air fuel operation can be prevented, thereby making it possible to prevent deterioration in drivability, etc. In addition, when the learning correction coefficient KLRN reaches the upper or lower bound value, there will be a possibility that some trouble might have occurred in the fuel supply system, so it can be used for failure determination.

Next in step S15 to step S19, a vaporized gas introduction correction coefficient KPRG for compensating for the change in the air fuel ratio due to the vaporized gas introduced into the intake pipe 12 is calculated.

First of all, it is determined whether a vaporized gas introduction condition holds (i.e., is satisfied) (step S15). When it is determined that the vaporized gas is not introduced (that is, No), the vaporized gas introduction correction coefficient KPRG is reset to "1.0" (step S19), and the calculation routine of FIG. 3 is terminated.

Here, note that a determination as to whether the vaporized gas introduction condition is satisfied or not is made by referring to a vaporized gas introduction inhibition flag ALPRG (to be described later) during the time when the alcohol concentration AL is changing, in such a manner that the introduction of the vaporized gas is permitted when "ALPRG=0", and it is inhibited when "ALPRG=1".

When in step S15 it is determined that the vaporized gas is being introduced (that is, Yes), it is then determined whether the integral calculation value KI is equal to or larger than "0" (step S16).

When in step S16 it is determined as KI≧0 (that is, Yes), it is indicated that the air fuel ratio is caused to vary to a lean side by the introduction of the vaporized gas, so the vaporized gas introduction correction coefficient KPRG is increased by an update gain DPRG, as shown in the following expression (10) (step S17), and the calculation routine of FIG. 3 is terminated.

$$KPRG \leftarrow KPRG + DPRG \quad (10)$$

On the other hand, when in step S16 it is determined as KI<0 (that is, No), the vaporized gas introduction correction coefficient KPRG is decreased by the update gain DPRG, as shown in the following expression (11) (step S18), and the calculation routine of FIG. 3 is terminated.

$$KPRG \leftarrow KPRG - DPRG \quad (11)$$

An amount of injection fuel Qfuel1 to be supplied to the engine 10 is set, as shown in the following expression (12), by using a basic amount of injection Qfuel0 for an alcohol concentration AL of 0%, an alcohol concentration correction coefficient KAL, the air fuel ratio correction coefficient KFB, the learning correction coefficient KLRN, and the vaporized gas introduction correction coefficient KPRG, all of which will be described in detail later.

$$Qfuel1 = Qfuel0 \times KAL \times KFB \times KLRN \times KPRG \quad (12)$$

In addition, the basic fuel amount Qfuel0 is calculated, as shown in the following expression (13), by using an actual amount of air Qacyl supplied to the engine 10, which is calculated from the amount of intake air qa detected by the air flow meter 33, and a target air fuel ratio AFo.

$$Qfuel0 = Qacyl/AFo \quad (13)$$

Figure 4:
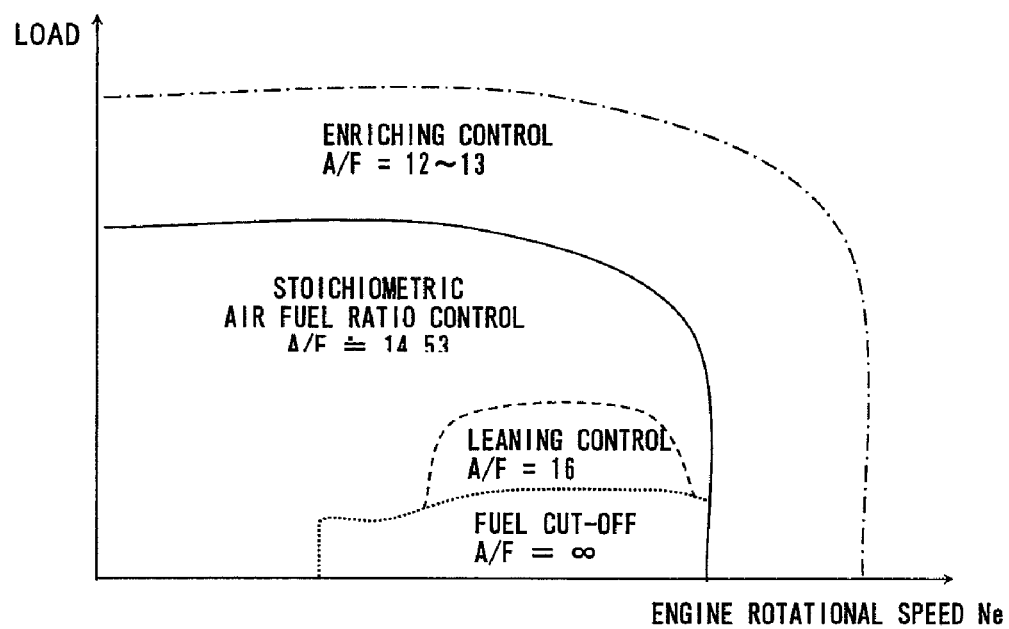
FIG. 4 is an explanatory view showing a two-dimensional map for setting a target air fuel ratio for air fuel ratio feedback control according to the first embodiment of the present invention.

The target air fuel ratio AFo is an air fuel ratio at an alcohol concentration of 0%, and is set to a value based on a two-dimensional map of an engine rotational speed Ne and an engine load (e.g., the amount of intake air qa, the degree of opening of the throttle valve 14, or the like), as shown in FIG. 4.

In FIG. 4, in case where the engine rotational speed Ne or the engine load is in a large range, the target air fuel ratio AFo for air fuel ratio enriching control is set to a value in the range of from 12 to 13, and in case where the engine (i.e., the engine rotational speed Ne) is in an intermediate operating range, the target air fuel ratio AFo for stoichiometric air fuel ratio control is set to a value of about 14.53. Also, in case where the engine rotational speed Ne is in the intermediate operating range and the engine load is in a small range, the target air fuel ratio AFo is set to a value of 16 for air fuel ratio leaning control or to an infinite value for fuel cut-off control.

Here, the amount of intake air qa is directly measured by the air flow meter 3, but it can be calculated in accordance with the intake pipe pressure Pa or the engine rotational speed Ne, or in accordance with the degree of opening of the throttle valve 14 and the engine rotational speed Ne, or in accordance with the opening and closing timing and the amounts of lift of the intake and exhaust valves of the engine 10.

Next, specific reference will be made to a update calculation routine for the alcohol concentration AL (estimated value) according to the first embodiment of the present invention while referring to a flow chart in FIG. 5 and explanatory views in FIGS. 6 through 10.

The control or calculation routine of FIG. 5 is executed by the ECU 35 at every predetermined time (e.g., 5 msec). In the calculation routine of FIG. 5, a determination as to whether the alcohol concentration AL starts to change is made from the variation of the air fuel ratio correction coefficient KFB, and the update time and the update gain of the alcohol concentration AL are set in accordance with a first accumulated amount of injection fuel INJSUMJD after the determination of the start of a change in the alcohol concentration AL (hereinafter referred to as an alcohol concentration change start determination), so that the alcohol concentration AL is updated from the variation of the air fuel ratio correction coefficient KFB.

In FIG. 5, the ECU 35 first determines, based on a change in the detection signal of the fuel level gage 9 in the fuel tank 20 or the like, whether fuel has been freshly supplied to the fuel tank 20 (step S21), and when it is determined that fuel has not been supplied to the fuel tank 20 (that is, No), the control process proceeds directly to step S24 (to be described later).

Here, note that in the determination as to whether the fuel tank 20 has been refueled (step S21), the change in the output of the fuel level gage 9 during the vehicle is in a stopped state may be monitored because the output value of the fuel level gage 9 is caused to fluctuate due to the variation of the liquid level in the fuel tank 20 during the vehicle is traveling, thus resulting in an incorrect determination.

When in step S21, an amount of increase in the fuel level within a sufficiently short predetermined time becomes equal to or more than a predetermined amount and it is determined that fuel has been supplied to the fuel tank 20 (that is, Yes), the initial values of the individual variables at the start of alcohol concentration learning are set (steps S22 and S23).

That is, the accumulated amount of injection fuel after refueling INJSUMRF (the third accumulated amount of injection fuel) is reset to "0" (step S22), and an alcohol concentration change start determination flag FALLRST is also set to "0" (i.e., not yet determined) (step S23). By resetting the alcohol concentration change start determination flag FALLRST to "0", it is set that the start of a change in the alcohol concentration AL has not been determined.

In case where the stored values of various control constants such as the output value of the fuel level gage 9, the alcohol concentration AL (the estimated concentration value), etc., have been reset by the reset processing of the ECU 35, it is assumed that a determination of the start of a change in the alcohol concentration AL holds or is made, and alcohol concentration estimation processing after the determination of the start of a change in the alcohol concentration AL may be forcedly started. With this, the alcohol concentration estimation processing can be started after the resetting of the ECU 35, and hence it is possible to prevent trouble due to alcohol concentration estimation errors.

In addition, in case where a determination is made that the fuel level gage 9 has failed, it may always be determined, as a fail safe measure, that the fuel tank 20 has been refueled, so that a determination of the start of alcohol concentration estimation due to the variation of the air fuel ratio correction coefficient KFB (to be described later) is performed. With this, even in the event of the failure of the fuel level gage 9, the alcohol concentration estimation processing can be started, thus making it possible to prevent trouble due to alcohol concentration estimation errors.

Subsequently, when fuel is supplied through injection from any of the injectors 21, the amount of injected fuel Qfuel1 is added to the accumulated amount of fuel injected after refueling INJSUMRF, as shown in the following expression (14), whereby the accumulated amount of fuel injected after refueling INJSUMRF is corrected and updated in this manner (step S24).

$$INJSUMRF \leftarrow INJSUMRF + Qfuel1 \quad (14)$$

Hereinafter, when the air fuel ratio correction coefficient KFB deviates from a range of from 1−KFBJD to 1+KFBJD of the predetermined threshold KFBJD, a determination is made that a change in the alcohol concentration has started, but prior to such a determination, the predetermined threshold KFBJD, which becomes a start determination reference, is first calculated (step S25). The predetermined threshold KFBJD is uniquely calculated in accordance with the accumulated amount of fuel injected after refueling INJSUMRF by the use of two-dimensional map data, for example, as shown in FIG. 6.

Figure 6:
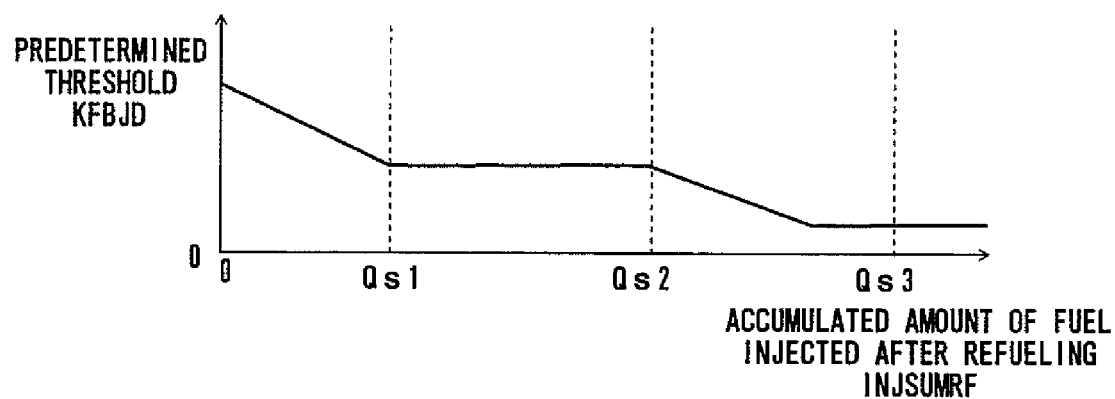
FIG. 6 is an explanatory view showing a two-dimensional map used for setting a predetermined threshold according to the first embodiment of the present invention.

In FIG. 6, the predetermined threshold KFBJD is reduced in accordance with the increasing accumulated amount of fuel injected after refueling INJSUMRF, thereby making it possible to improve the accuracy in the determination of the start of a change in the alcohol concentration AL. For example, the accumulated amount of fuel injected after refueling INJSUMRF, being in the range of from Qs1 to Qs2 (Qs1≦INJSUMRF<Qs2), corresponds to an ordinary use condition (e.g., a variation range of dead time due to the generation of vapor or the like during the engine 10 is in a stopped state).

In addition, the predetermined threshold KFBJD is set to a appropriate value so as to prevent an incorrect start determination from being made by a temporary variation of the air fuel ratio correction coefficient KFB due to an external disturbance such as an acceleration or deceleration of the vehicle.

Also, the amount of vapor generation changes depending on certain conditions such as the temperature of the engine (the cooling water temperature TW) before engine stoppage, the period of engine stoppage, etc., so a period of time in which the accumulated amount of fuel injected after refueling INJSUMRF is in the range of (Qs1≦INJSUMRF<Qs2) is set to a variation range experimentally obtained beforehand.

Further, in a period of time in which the accumulated amount of fuel injected after refueling INJSUMRF is equal to or larger than Qs2 (i.e., INJSUMRF≧Qs2), the predetermined threshold KFBJD is gradually decreased so that the start determination is carried out even when the amount of alcohol concentration change due to refueling is small and hence the amount of change of the air fuel ratio correction coefficient KFB is small.

Furthermore, in FIG. 6, a range in which the accumulated amount of fuel injected after refueling INJSUMRF is equal to or larger than 0 and smaller than Qs1 (i.e., 0≦INJSUMRF<Qs1) corresponds to a non-ordinary condition (e.g., a case where a delay due to dead time is decreased to a great extent, for example, by replacement of fuel piping, etc.).

This condition (0≦INJSUMRF<Qs1) can occur though at a low frequency, so the predetermined threshold KFBJD under this condition is set in such a manner that it becomes larger as the accumulated amount of fuel injected after refueling INJSUMRF approaches "0".

As a consequence, the alcohol concentration change start determination becomes less prone to hold, but in case where a large change in the alcohol concentration occurs, the alcohol concentration change start determination is carried out, thus making it possible to prevent the trouble due to concentration estimation errors. Alternatively, under such a condition, the predetermined threshold KFBJD may not be set to be variable in accordance with the accumulated amount of injected fuel INJSUMRF, but may instead be simply set to a constant or fixed value.

Returning to FIG. 5, a filter value KFB_flt is then calculated for the purpose of removing noise in the air fuel ratio correction coefficient KFB used for alcohol concentration change start determination (step S26). Here, note that the calculation of the filter value KFB_flt is performed by means of well-known first order delay processing, moving average processing, etc.

In general, the air fuel ratio correction coefficient KFB is always caused to fluctuate at high frequencies as compared with the alcohol concentration change, due to feedback control, external disturbances, etc., so the comparison result of the air fuel ratio correction coefficient KFB with the predetermined threshold KFBJD might not become stable, and there will be a possibility of causing deterioration in the determination accuracy.

Accordingly, the determination accuracy can be improved by performing the alcohol concentration change start determination by the use of the filter value KFB_flt from which the high frequency variation of the air fuel ratio correction coefficient KFB is removed.

Here, it is preferable that the update of the filter value KFB_flt be performed only when a predetermined time has elapsed after the start of air fuel ratio feedback control, but the filter value KFB_flt be held at the last value at other times without performing the update thereof.

For example, when the air fuel ratio feedback control is not performed, the air fuel ratio correction coefficient KFB is reset to "1.0", as shown in the above-mentioned step S8 (FIG. 3), so if the filter processing is continued in this state, the filter value KFB_flt is approaching "1.0", thus giving rise to a problem that the alcohol concentration change start determination might be interrupted or stopped. In addition, after the start of the air fuel ratio feedback control, a certain period of time is required until the air fuel ratio correction coefficient KFB becomes stabilized from the reset value of "1.0".

Accordingly, by performing the update processing of the filter value KFB_flt after the predetermined time has elapsed after the start of the air fuel ratio feedback control, it is possible to prevent the filter value KFB_flt from being varied due to the resetting of the air fuel ratio correction coefficient KFB during the open loop control, thereby making it possible to improve the accuracy of the alcohol concentration change start determination.

Subsequently, in steps S27 through S34, the determination of the start of a change in the alcohol concentration AL is performed.

First of all, depending on whether the alcohol concentration change start determination flag FALLRST is "0" (in an undetermined state), it is determined whether the alcohol concentration change start determination is permitted (step S27). When it is determined as FALLRST=1 (that is, No), a determination delay INJSUMDLY is reset to "0" without permitting the alcohol concentration change start determination (step S30), and the control process advances to step S31 (to be described later).

On the other hand, when in step S27, the alcohol concentration change start determination has not yet been made after refueling and it is determined as FALLRST=0 (that is, Yes), the alcohol concentration change start determination is permitted, and it is determined whether the filter value KFB_flt of the air fuel ratio correction coefficient is out of the range of the predetermined threshold KFBJD (step S28).

When in step S28, it is determined that the filter value KFB_flt is larger than "1−KFBJD" and smaller than "1+KFBJD" (i.e., "1−KFBJD<KFB_flt<1+KF BJD" and hence is within the range of the predetermined threshold KFBJD (that is, No), the control process proceeds to reset processing step S30 in which the determination delay INJSUMDLY is reset to "0".

On the other hand, when in step S28, it is determined that the filter value KFB_flt is equal to or larger than "1+KFBJD" (i.e., "KFB_flt≧1+KFBJD") or equal to or smaller than "1−KFBJD" (i.e., "KFB_flt≦1−KFBJD" and is out of the range of the predetermined threshold KFBJD (that is, Yes), the determination delay INJSUMDLY is updated (step S29), and the control process advances to step S31.

At this time, the determination delay INJSUMDLY is updated and calculated in such a manner that it is increased by the amount of injection fuel Qfuel1, as shown in the following expression (15).

$$INJSUMDLY \leftarrow INJSUMDLY + Q\text{fuel1} \quad (15)$$

Here. when the accumulated amount of injection fuel after refueling INJSUMRF reaches a predetermined value (e.g., Qs1 in FIG. 6) or more, there is a high possibility that the delay due to the dead time is terminated, so the alcohol concentration change start determination processing may be started.

In addition, in case where the alcohol concentration change start determination processing is not terminated even when the accumulated amount of fuel injected after refueling INJSUMRF reaches the predetermined value (Qs2 or Qs3) or more, there is a possibility that no change in the alcohol concentration is generated by refueling, so the alcohol concentration change start determination processing may be interrupted and not execute the subsequent alcohol concentration update processing may be not executed.

Thus, by setting the period, in which the alcohol concentration change start determination processing is performed, based on the accumulated amount of fuel injected after refueling INJSUMRF, it becomes possible to perform the alcohol concentration change start determination processing within a period in which there is a high possibility that a change in the alcohol concentration is generated, as a result of which the accuracy of the alcohol concentration change start determination can be improved.

Then, it is determined whether the determination delay INJSUMDLY is equal to or larger than a predetermined set value XDLY (step S31), and when determined as INJSUMDLY<XDLY (that is, No), the control process proceeds directly to step S35 (to be described later).

On the other hand, when it is determined as INJSUMDLY≧XDLY in step S31 (that is, Yes), it is assumed that a change in the alcohol concentration has started, and the alcohol concentration change start determination flag FALLRST is set to "1" (step S32).

Thus, by setting the determination delay INJSUMDLY in this manner, it is possible to prevent an incorrect determination of the start of a change in the alcohol concentration change resulting from a temporary variation of the air fuel ratio correction coefficient KFB due to an external disturbance such as an acceleration or deceleration of the vehicle, etc., thereby making it possible to improve the accuracy in the estimation of the alcohol concentration.

In addition, because the alcohol concentration AL changes in accordance with the accumulated amount of fuel injected after refueling INJSUMRF, the accuracy in the determination of the start of a change in the alcohol concentration AL can be improved by setting the determination delay INJSUMDLY in accordance with the accumulated amount of injected fuel INJSUMRF, whereby the accuracy in the estimation of the alcohol concentration can be improved.

Subsequently, the accumulated amount of fuel injected after the alcohol concentration change start determination INJSUMJD (the first accumulated amount of injection fuel) is reset to "0" (step S33), and the learning correction coefficient KLRN is also reset to the central value "1.0" (step S34), after which the control process proceeds to step S35.

Here, note that in case where the learning correction coefficient KLRN is held for each engine operating condition, the values of the learning correction coefficients for all the engine operating conditions may be reset to "1.0", but instead, the learning correction coefficients for all the engine operating conditions may be uniformly variably set in such a manner that an average value of the learning correction coefficients for all the engine operating conditions become "1.0".

By resetting the learning correction coefficient KLRN in this manner, an accumulation of incorrect learnings can be prevented even when the variation of the air fuel ratio correction coefficient KFB due to the alcohol concentration change has been incorrectly learned by the learning correction coefficient KLRN.

In addition, the learning correction coefficient KLRN and the alcohol concentration correction coefficient KAL are updated by using the same air fuel ratio correction coefficient KFB and hence influenced from each other, so the accuracy in the estimation of the alcohol concentration AL can be improved by preventing the learning correction coefficient KLRN from being learned incorrectly.

By resetting the learning correction coefficient KLRN to "1" after the alcohol concentration change start determination, the air fuel ratio correction coefficient KFB is stabilized in the vicinity of the center by means of the learning correction coefficient KLRN before resetting in the course of the alcohol concentration change start determination, whereby it is possible to improve the accuracy in detecting the variation of the air fuel ratio correction coefficient KFB due to the alcohol concentration change, as well as the accuracy in the estimation of the alcohol concentration that is started after the alcohol concentration change start determination.

Further, by uniformly variably setting the values of the learning correction coefficients KLRN for all the engine operating conditions in such a manner that the average value of the learning correction coefficients for all the engine operating conditions becomes "1.0", it is possible to improve the estimation accuracy of the alcohol concentration while holding the learning correction coefficient KLRN that can absorb characteristic variations differing according to the engine operating conditions.

Thereafter, when fuel is supplied through injection from any of the injectors 21, the amount of injected fuel Qfuel1 is added to the accumulated amount of fuel injected after the alcohol concentration change start determination INJSUMJD, as shown in the following expression (16), whereby the accumulated amount of fuel injected after the alcohol concentration change start determination INJSUMJD is updated (step S35).

$$INJSUMJD \leftarrow INJSUMJD + Qfuel1 \qquad (16)$$

Subsequently, it is determined whether an update condition for the alcohol concentration AL (estimated value) holds (step S36), and when it is determined that the alcohol concentration update condition does not hold (that is, No), the control process proceeds directly to step S41 (to be described later).

As the alcohol concentration update condition, there are enumerated the following ones: the accumulated amount of fuel INJSUMJD injected after the alcohol concentration change start determination is equal to or less than a predetermined set value XJD; the air fuel ratio feedback control is being carried out; and a purge gas is not being introduced.

A first order delay alcohol concentration change after a change in the alcohol concentration starts is changed in accordance with the accumulated amount of injected fuel INJSUMJD after the start of the alcohol concentration change, and is terminated when the accumulated amount of injected fuel INJSUMJD reaches a predetermined amount. Accordingly, an appropriate update period can be set by setting an alcohol concentration update period in accordance with the accumulated amount of injected fuel INJSUMJD after the alcohol concentration change start determination, whereby the accuracy in the estimation of the alcohol concentration can be improved.

Figure 7:
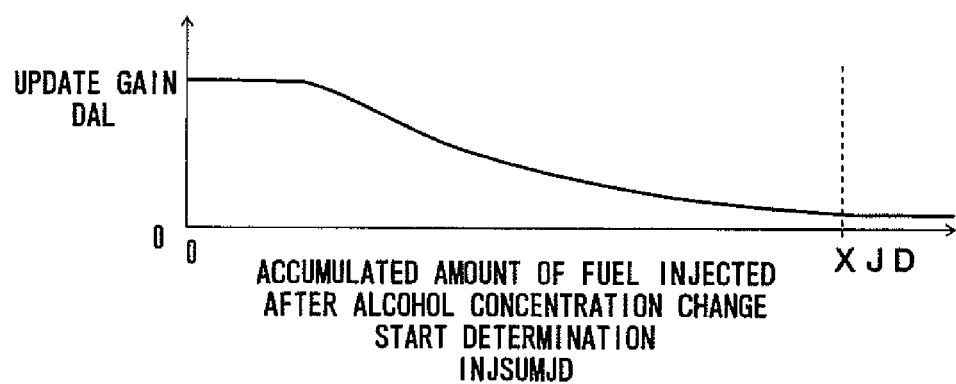
FIG. 7 is an explanatory view showing a two-dimensional map used for setting an update gain according to the first embodiment of the present invention.

On the other hand, when it is determined in step S36 that the alcohol concentration update condition holds (that is, Yes), an update gain DAL of the alcohol concentration AL, which is a control constant, is calculated (step S37). At this time, the update gain DAL is calculated in accordance with the accumulated amount of fuel INJSUMJD injected after the alcohol concentration change start determination by the use of two-dimensional map data, as shown in FIG. 7.

In general, from the behavior of the first order delay concentration change, the speed of the alcohol concentration change is great immediately after the start of the alcohol concentration change is determined, so the update gain DAL is set to a large value so as to follow the alcohol concentration change, as shown in FIG. 6.

Thereafter, as the accumulated amount of injected fuel INJSUMJD increases, the speed of the alcohol concentration change becomes smaller, so the update gain DAL is gradually set to smaller values, whereby the concentration update value is made to be stable. As a result, appropriate values of the update gain DAL can be set in accordance with the behavior of the alcohol concentration change, thus making it possible to improve the accuracy of the alcohol concentration estimation.

Next, it is determined whether the integral calculation value KI (integral term) of the fuel feedback correction coefficient is equal to or larger than "0" (step S38), and when it is determined as KI≧0 (that is, Yes), it is indicated that an actual value of the alcohol concentration (actual alcohol concentration) is lower than the alcohol concentration AL (estimated value), so the alcohol concentration AL is corrected to increase by the update gain DAL, as shown in the following expression (17) (step S39).

$$AL \leftarrow AL + DAL \qquad (17)$$

On the other hand, when in step S38 it is determined as KI<0 (that is, No), the alcohol concentration AL is corrected to decrease by the update gain DAL, as shown in the following expression (18) (step S40).

$$AL \leftarrow AL - DAL \qquad (18)$$

Figure 8:
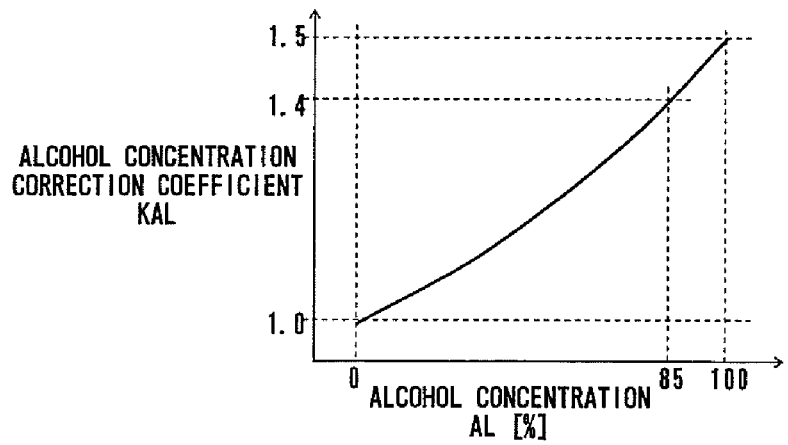
FIG. 8 is an explanatory view showing a two-dimensional map used for setting an alcohol concentration correction coefficient according to the first embodiment of the present invention.

Subsequently, the alcohol concentration correction coefficient KAL for correcting the amount of injection fuel Qfuel1 is calculated by the use of two-dimensional map data, as shown in FIG. 8, in accordance with the alcohol concentration AL thus corrected increasingly or decreasingly by the above expression (17) or (18) (step S41).

In FIG. 8, the alcohol concentration correction coefficient KAL is set to "1.0" when the alcohol concentration AL is 0%, and it is set to "1.4" when the alcohol concentration AL in the case of using ethanol as alcohol is 85%.

Then, it is determined whether a condition for inhibiting vaporized gas being introduced through the canister 8 holds (step S42). At this time, as the vaporized gas introduction inhibiting condition, there are enumerated the following cases: the determination of the start of a change in the alcohol concentration AL is being performed; and the accumulated amount of fuel INJSUMJD injected after the alcohol concentration change start determination is equal to or less than the predetermined set value XJD.

When it is determined in step S42 that the vaporized gas introduction inhibiting condition holds, a vaporized gas introduction inhibition flag ALPRG is set to "1" (i.e., the introduction of the vaporized gas is inhibited), whereas when it is determined that the vaporized gas introduction inhibiting condition does not hold, the vaporized gas introduction inhibition flag ALPRG is set to "0" (i.e., the introduction of the vaporized gas is permitted).

Thus, by inhibiting the introduction of the vaporized gas in the course of the alcohol concentration change start determination or during the alcohol concentration change, it is possible to prevent the variation of the air fuel ratio correction coefficient KFB due to the introduction of the vaporized gas, thereby making it possible to improve the accuracy in the determination of the start of the alcohol concentration change.

However, if the introduction of the vaporized gas is always inhibited to decrease the amount of introduction of the vaporized gas during the alcohol concentration change, the adsorption capacity of the canister 8, which serves to adsorb the vaporized gas, might be exceeded, thus giving rise to a fear that the vaporized gas could be released into the atmosphere thereby to generate air contamination.

Figure 9:
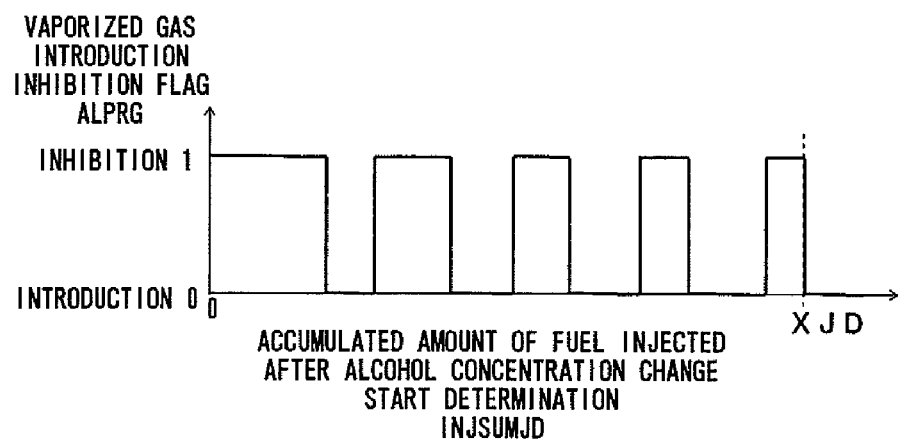
FIG. 9 is an explanatory view showing a two-dimensional map of an evaporated gas introduction inhibition flag according to the first embodiment of the present invention.

Accordingly, in order to introduce the vaporized gas in an appropriate manner even during the alcohol concentration change, the introduction of the vaporized gas may be permitted in accordance with the accumulated amount of fuel INJSUMJD injected after the alcohol concentration change start determination by switching the vaporized gas introduction inhibition flag ALPRG to "0" (permission of the introduction of the vaporized gas) in a discrete manner, as shown in a two-dimensional map (timing) of FIG. 9.

In FIG. 9, for a certain period of time after the start of a change in the alcohol concentration has been determined, the change of the alcohol concentration is large because of the first order delay alcohol concentration change, so the estimation of the alcohol concentration is performed while inhibiting the introduction of the vaporized gas, so as to follow the alcohol concentration change.

On the other hand, the alcohol concentration change becomes smaller as the accumulated amount of injected fuel increases, so the vaporized gas is introduced in a discrete manner, and at the same time, the period of time for introducing the vaporized gas is gradually increased.

Thus, by setting the introduction time of the vaporized gas in accordance with the accumulated amount of fuel INJSUMJD injected after the alcohol concentration change start determination, the estimation of the alcohol concentration can be prevented from being deteriorated, so the amount of introduction of the vaporized gas can be increased while maintaining the accuracy in the estimation of the alcohol concentration.

Then, it is determined whether a learning value update inhibiting condition for the learning correction coefficient KLRN holds (step S43). As learning value update inhibiting condition, there are enumerated the following cases: the alcohol concentration change start determination flag FALLRST is "0" and the determination of the start of a change in the alcohol concentration AL is being performed; and the accumulated amount of fuel INJSUMJD injected after the alcohol concentration change start determination is equal to or less than the predetermined set value XJD.

When it is determined in step S43 that the learning value update inhibition condition for the learning correction coefficient KLRN, the update permission flag FFBLRN is set to "0" (i.e., update is inhibited), whereas when it is determined that the learning value update inhibition condition does not hold, the update permission flag FFBLRN is set to "1" (i.e., update is permitted).

In general, in the course of the determination of the start of a change in the alcohol concentration AL, there is a possibility that the alcohol concentration changes, so by inhibiting the update of the learning correction coefficient KLRN, it is possible to prevent incorrect learning due to the alcohol concentration change, whereby the accuracy in the estimation of the alcohol concentration can be improved, and at the same time, the variation of the air fuel ratio correction coefficient KFB due to the alcohol concentration change can be prevented from being absorbed by the learning correction coefficient KLRN, thereby making it possible to prevent a reduction in the accuracy of the alcohol concentration change start determination.

Finally, a determination is made as to whether an inhibition condition for the air fuel ratio open-loop control holds (step S44), and the calculation routine of FIG. 5 is terminated. As a condition for the air fuel ratio open-loop control, there are enumerated air fuel ratio enriching control under high load, air fuel ratio leaning control for improving fuel mileage, air fuel ratio enriching control after engine starting, and so on. On the other hand, as the inhibition condition for the air fuel ratio open-loop control, there are enumerated the following cases: the determination of the start of a change in the alcohol concentration AL is being performed; and the accumulated amount of fuel INJSUMJD injected after the alcohol concentration change start determination is equal to or less than the predetermined set value XJD.

For a period of time with the possibility of a change in the alcohol concentration, air fuel ratio feedback control is performed in a reliable manner while inhibiting air fuel ratio open-loop control, so that alcohol concentration estimation processing can be performed, thereby making it possible to improve the accuracy in the estimation of the alcohol concentration.

Figure 10:
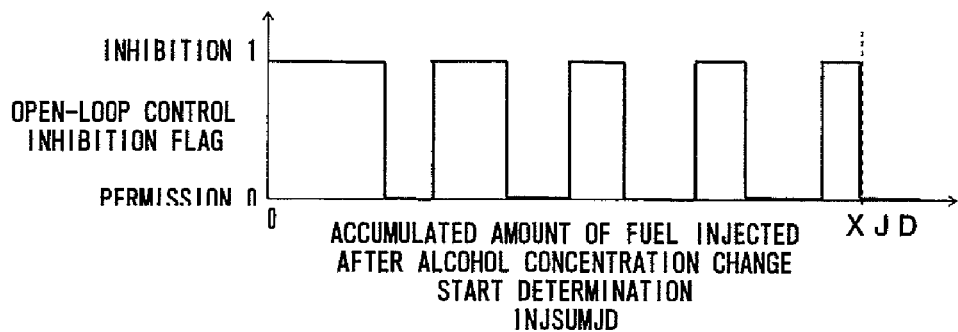
FIG. 10 is an explanatory view showing a two-dimensional map of an air fuel ratio open loop control inhibition flag according to the first embodiment of the present invention.

However, if the air fuel ratio open-loop control is always inhibited during the change in the alcohol concentration, the intended intrinsic function can be impaired, so the inhibition period for the air fuel ratio open-loop control may be set in accordance with the accumulated amount of fuel INJSUMJD injected after the alcohol concentration change start determination by switching an open-loop inhibition flag to "0" (permission of the air fuel ratio open-loop control) in a discrete manner, as shown in a two-dimensional map (timing) of FIG. 10, whereby the open-loop control inhibition period can be shortened.

In FIG. 10, for a certain period of time after the start of a change in the alcohol concentration has been determined, the change of the alcohol concentration is large, so the estimation of the alcohol concentration is carried out so as to follow the change of the alcohol concentration by performing the air fuel ratio feedback control, while inhibiting the air fuel ratio open-loop control.

Thereafter, the change in the alcohol concentration becomes smaller as the accumulated amount of fuel INJSUMJD injected after the alcohol concentration change start determination increases, so the open-loop control prohibition period is gradually set shorter while inhibiting the air fuel ratio open-loop control in a discrete manner. As a result, the accuracy in the estimation of the alcohol concentration can be prevented from being deteriorated, whereby the prohibition period of the air fuel ratio open-loop control can be shortened while maintaining the accuracy in the estimation of the alcohol concentration.

In addition, the alcohol concentration AL (the estimated value), the accumulated amount of fuel injected after refueling INJSUMRF (the third accumulated amount of injection fuel), the accumulated amount of fuel INJSUMJD injected after the alcohol concentration change start determination (the first accumulated amount of injection fuel), and the output value of the fuel level gage 9 are all held or stored in the backup RAM or the EEPROM in the ECU 35, and hence it is designed such that they are not reset at the time when the engine 10 is stopped or the power supply for the ECU 35 is turned off.

In case when the backup RAM and the EEPROM in the ECU 35 are reset, a medium alcohol concentration (about 40%) is set as an initial value of the alcohol concentration AL (estimated value). In this case, however, it is necessary to estimate the alcohol concentration AL again, so in the refueling determination processing (step S21) in FIG. 5, a determination is made that refueling has been carried out, and the estimation of the alcohol concentration is forcedly started, or in the alcohol concentration change start determination processing (step S31), a determination is made that a change in the alcohol concentration has started, and the estimation of the alcohol concentration is forcedly started.

Moreover, the alcohol concentration AL (estimated value) is used for various kinds of control such as fuel control, ignition control, and so on, wherein the fuel control includes a fuel control operation at the time of engine starting, etc., and the ignition control includes ignition timing calculation, control constant calculation for knock control, etc.

In steps S38 through S40 in FIG. 5, the alcohol concentration AL is updated to increase or decrease in accordance with the fact that the integral calculation value KI is equal to or larger than "0", or that the integral calculation value KI is equal to or less than "0", but the alcohol concentration AL may instead be obtained from the alcohol concentration correction coefficient KAL and the integral calculation value KI. The value of "KAL×(1+KI)" based on the alcohol concentration correction coefficient KAL and the integral term KI corresponds to a true alcohol concentration correction coefficient KAL for compensating for the current alcohol concentration from an alcohol concentration of 0%, so the alcohol concentration correction coefficient KAL can be updated directly and periodically, as shown in the following expression (19).

$$KAL \leftarrow KAL \times (1+KI) \quad (19)$$

When the alcohol concentration correction coefficient KAL is updated, the variation of the integral calculation value KI is reflected on the alcohol concentration correction coefficient KAL, so the integral calculation value KI is reset to "0".

In addition, the true alcohol concentration AL can be calculated, as a map function of the alcohol concentration correction coefficient KAL, according to the following expression (20) by using a characteristic map of the alcohol concentration AL and the alcohol concentration correction coefficient KAL, as shown in FIG. 8.

$$AL \leftarrow MAP(KAL) \quad (20)$$

The integral calculation value KI always varies according to the feedback control, and the alcohol concentration AL (estimated value) also varies. Therefore, a value which is obtained by applying filter processing to the integral calculation value KI, or a value which is obtained by applying a moving average to the integral calculation value KI, may be used for updating the alcohol concentration correction coefficient KAL.

Moreover, the filtering effect may be increased by setting a filter constant (i.e., a control constant) to a value that becomes larger in accordance with the increasing accumulated amount of injected fuel after the alcohol concentration change start determination, or a moving average period (i.e., a control constant) may be set longer in accordance with the increasing accumulated amount of injected fuel after the alcohol concentration change start determination.

Thus, in a period of time in which the accumulated amount of injected fuel is small and the change in the alcohol concentration is large, the estimation of the alcohol concentration is carried out by the use of a value close to the actual integral calculation value KI so as to follow the change in the alcohol concentration.

On the other hand, in a period of time in which the accumulated amount of injected fuel is large and the change in the alcohol concentration is small, the effect of smoothing the actual integral calculation value KI is made greater, thereby making it possible to stabilize the alcohol concentration AL (estimated value).

In addition, as stated above, for the period in which the alcohol concentration change start determination is executed, there is a possibility that the variation of the air fuel ratio correction coefficient KFB becomes large, a failure diagnosis according to the variation of the air fuel ratio correction coefficient KFB may be inhibited, thereby excluding a factor due to the change in the alcohol concentration AL from the failure diagnosis.

Further, the lower the amount of intake air qa passing through the throttle valve 14, the relatively greater becomes the influence of external disturbances due to fluid passages with the intake pipe 12 other than the throttle valve 14 (e.g., a blowby gas leaking from the engine 10, an air flow or movement of a brake master back, etc), so there is a possibility that the variation of the air fuel ratio correction coefficient KFB might become large, thereby decreasing the accuracy in the estimation of the alcohol concentration.

Accordingly, it is desirable that the final estimated value of the alcohol concentration, after the accumulated amount of fuel INJSUMJD injected after the alcohol concentration change start determination becomes equal to or larger than the predetermined set value XJD and the alcohol concentration update period has terminated, be updated after the amount of intake air qa reaches a predetermined value or more.

Figure 11:
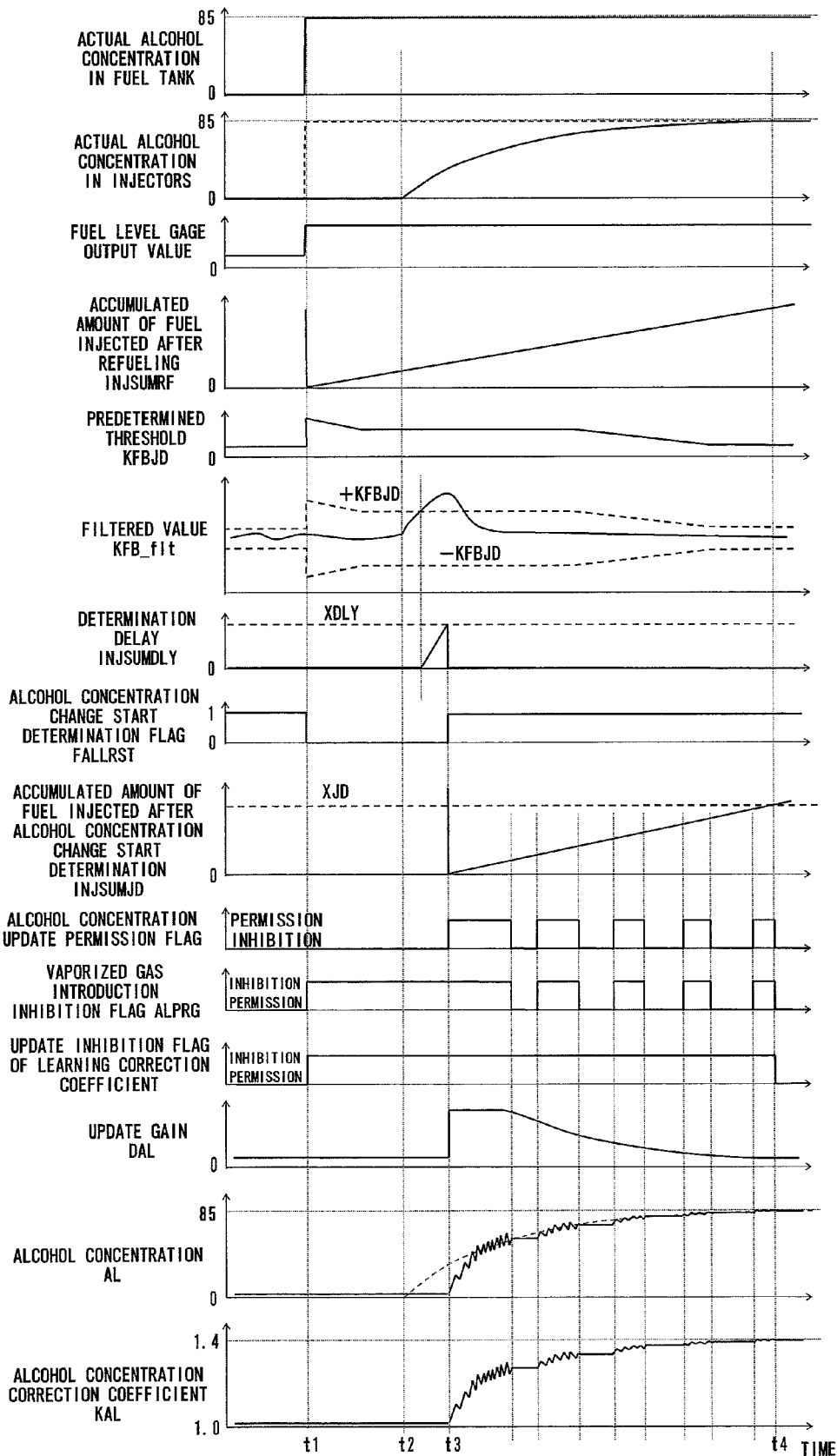
FIG. 11 is a timing chart illustrating processing for estimating an alcohol concentration according to the first embodiment of the present invention.
Figure 12:
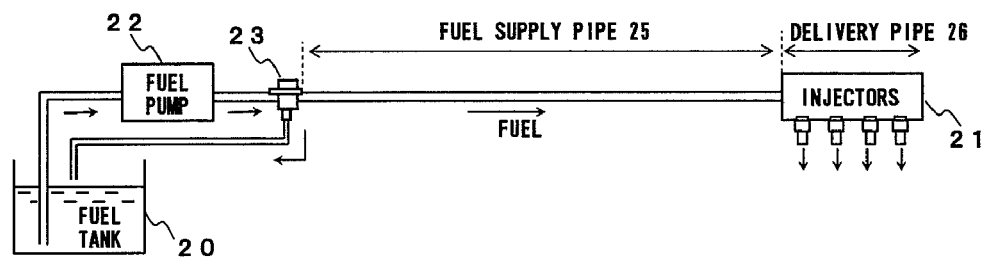
FIG. 12 is a block diagram schematically showing a general returnless fuel supply system used in a conventional control apparatus for an internal combustion engine.
Figure 13:
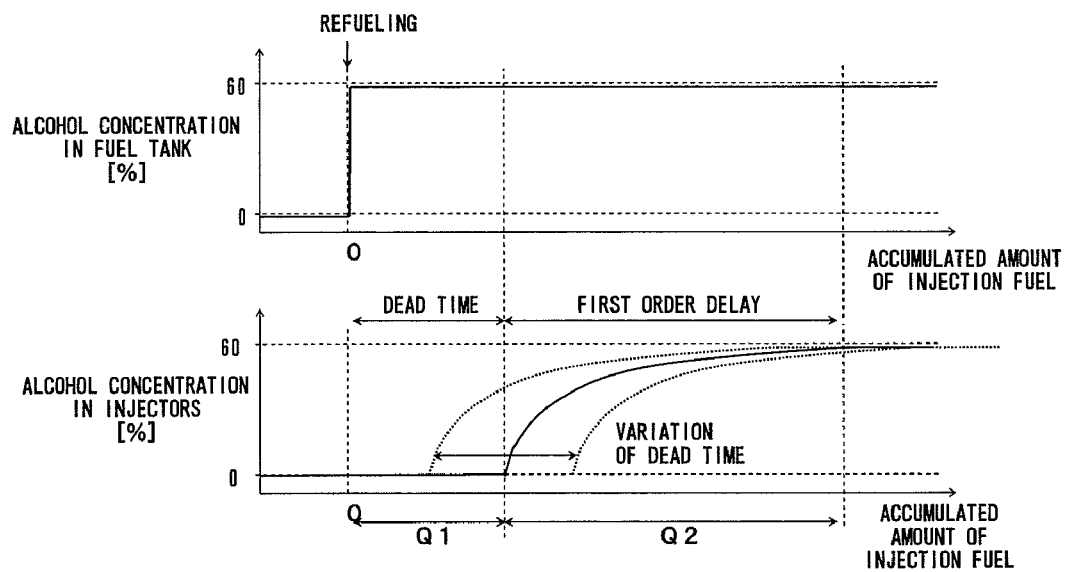
FIG. 13 is a waveform chart showing a delay of an alcohol concentration change in a conventional control apparatus for an internal combustion engine.

Next, specific behaviors (changes over time) of individual parameters according to the first embodiment of the present invention will be described while referring to a timing chart of FIG. 11. FIG. 11 shows a processing operation according to the calculation routine of FIG. 5, wherein the changes over time of the individual parameters are illustrated in association with one another.

In FIG. 11, there are shown the changes over time of the actual alcohol concentration in the fuel tank 20, the actual alcohol concentration in the injectors 21, the output value of the fuel level gage 9, the accumulated amount of fuel injected after refueling INJSUMRF, the predetermined threshold KFBJD for alcohol concentration change start determination, the filter value KFB_flt of the air fuel ratio correction coefficient, the determination delay INJSUMDLY, the alcohol concentration change start determination flag FALLRST, the accumulated amount of fuel INJSUMJD injected after the alcohol concentration change start determination, an alcohol concentration update permission flag, the vaporized gas introduction inhibition flag ALPRG, an update inhibition flag of the learning correction coefficient KLRN, the update gain DAL, the alcohol concentration AL, and the alcohol concentration correction coefficient KAL.

In addition, FIG. 11 shows the behavior of the control apparatus in which the alcohol concentration before refueling is 0%, and the actual alcohol concentration in the fuel tank 20 has changed to 85% as a result of refueling of alcohol fuel. At time point t1, alcohol fuel is refueled into the fuel tank 20, and the actual alcohol concentration in the fuel tank 20 changes from 0% to 85%.

On the other hand, the actual alcohol concentration in the injectors 21 begins to change in the first order delay from time point t2 delayed by a dead time from time point t1 due to a returnless fuel transportation delay, and the change terminates at time point t4, with the result that the actual alcohol concentration in the injectors 21 becomes 85%, which is the same as the actual alcohol concentration in the fuel tank 20.

At this time, the termination time point t2 of the dead time is varied due to the generation of vapor, etc., so the estimation processing of the alcohol concentration AL is permitted by detecting the termination time point of the dead time, i.e., the starting time of the alcohol concentration change in the first order delay, based on the variation of the air fuel ratio correction coefficient KFB.

Now, the processing in the ECU 35 will be described below.

At time point t1, a refueling determination is made based on a change of the fuel level gage 9 in the fuel tank 20, wherein the alcohol concentration change start determination flag FALLRST is set to "0" (not yet determined), and the processing of determining the start of a change in the alcohol concentration is started.

In addition, the accumulated amount of fuel injected after refueling INJSUMRF is reset to "0" in accordance with the result of the refueling determination, and the amount of injected fuel Qfuel1 is summed or integrated each time fuel is injected from any of the injectors 21. The predetermined threshold KFBJD, which becomes a comparison determination reference for the air fuel ratio correction coefficient KFB, is calculated in accordance with the accumulated amount of fuel injected after refueling INJSUMRF.

Subsequently, at time point t2, the dead time terminates, and a change in the alcohol concentration in the first order delay starts, and the air fuel ratio correction coefficient KFB for correcting the change in the alcohol concentration is increased.

Hereinafter, at the time when the filter value KFB_flt of the air fuel ratio correction coefficient KFB becomes out of the range of the predetermined threshold KFBJD (in FIG. 11, KFB_flt>+KFBJD), the determination delay INJSUMDLY is started to count up by the use of the accumulated amount of fuel injected after refueling INJSUMRF.

Subsequently, when the determination delay INJSUMDLY reaches the predetermined set value XDLY at time point t3, it is assumed that the determination of the start of a change in the alcohol concentration has terminated, and the alcohol concentration change start determination flag FALLRST is set to "1".

When the determination of the start of a change in the alcohol concentration terminates at time point t3, the accumulated amount of fuel INJSUMJD injected after the alcohol concentration change start determination is reset to "0", and the amount of injected fuel Qfuel1 is summed or integrated each time fuel is injected from any of the injectors 21.

The alcohol concentration update period is set to be between from time point t3 to time point t4 at which the accumulated amount of fuel INJSUMJD injected after the alcohol concentration change start determination reaches XJD corresponding to the termination time period of the alcohol concentration change in the first order delay.

However, as stated above, the update of the alcohol concentration is inhibited during the time the vaporized gas is being introduced.

The introduction of the vaporized gas is set in accordance with the accumulated amount of fuel INJSUMJD injected after the alcohol concentration change start determination, and for a certain period of time after the start of a change in the alcohol concentration has been determined, the change of the alcohol concentration is large, so the estimation of the alcohol concentration is performed while inhibiting the introduction of the vaporized gas, so as to follow the alcohol concentration change.

Thereafter, as the accumulated amount of fuel INJSUMJD injected after the alcohol concentration change start determination becomes larger, the introduction period of the vaporized gas is increased and the update of the alcohol concentration is interrupted, but the change of the alcohol concentration is small, so the amount of introduction of the vaporized gas can be increased while maintaining following the change of the alcohol concentration.

In addition, by inhibiting the introduction of the vaporized gas during an alcohol concentration change start determination period from time point t1, too, it is possible to prevent the variation of the air fuel ratio correction coefficient KFB due to the introduction of the vaporized gas, thereby making it possible to improve the accuracy in the determination of the start of the alcohol concentration change.

Moreover, the update gain DAL of the alcohol concentration AL (estimated value) is set in accordance with the accumulated amount of fuel INJSUMJD injected after the alcohol concentration change start determination, and the change of the alcohol concentration is large for a certain time after the alcohol concentration change start determination. Accordingly, the update gain DAL is set to a large value so that the alcohol concentration change can be followed.

Thereafter, as the accumulated amount of injected fuel INJSUMJD after the determination of the start of a change in the alcohol concentration increases, the speed of the alcohol concentration change becomes smaller so the update gain DAL is gradually set to smaller values, whereby the change of the concentration update value is reduced, thereby making the concentration update value stable.

Thus, by setting the control constant (the update gain DAL) for the update of the alcohol concentration in accordance with the accumulated amount of fuel INJSUMJD injected after the alcohol concentration change start determination, it is possible to set an appropriate control constant matched to the behavior of the change in the alcohol concentration, thereby making it possible to improve the accuracy in the estimation of the alcohol concentration.

In addition, in a period of time from time point t1 to time point t4, there is a possibility that a change in the alcohol concentration might be generated, so incorrect learning due to the alcohol concentration change is prevented by inhibiting the update of the learning correction coefficient KLRN.

Moreover, incorrect learning is prevented from being accumulated by resetting the learning correction coefficient KLRN at time point t3 at which the alcohol concentration change start determination terminates.

The learning correction coefficient KLRN and the alcohol concentration correction coefficient KAL have mutual influences on each other, so the accuracy in the estimation of the alcohol concentration can be improved by preventing the learning correction coefficient KLRN from being learned incorrectly.

As described above, by detecting the starting time of a change in the alcohol concentration based on the variation of the air fuel ratio correction coefficient KLRN with a high degree of precision, by performing the setting of the update period of the alcohol concentration AL (estimated value), the setting of the control constant (the update gain DAL) for the update of the alcohol concentration, the setting of the introduction time of the vaporized gas, and by preventing the incorrect learning of the learning correction coefficient KLRN, in accordance with the accumulated amount of fuel INJSUMJD injected after the alcohol concentration change start determination, so as to match the change of the alcohol concentration in the first order delay, it is possible to improve the accuracy in the estimation of the alcohol concentration, as well as to increase the amount of introduction of the vaporized gas.

Here, note that even if a linear type oxygen concentration sensor having a linear output with respect to a change in the air fuel ratio of an exhaust gas is used as the oxygen concentration sensor 29, air fuel ratio feedback control can be carried out, and the alcohol concentration AL can be estimated, so similar effects can be obtained.

In addition, in the case of using the linear type oxygen concentration sensor as the oxygen concentration sensor 29, in air fuel ratio enriching or leaning control other than stoichiometric air fuel ratio control, too, the estimation of the alcohol concentration can be made by executing air fuel ratio feedback control while setting the target air fuel ratio AFo to a rich or lean value. At this time, even during the alcohol concentration is changing, air fuel ratio feedback control for enriching or leaning the air fuel ratio of a mixture to be supplied to the injectors 21 is performed, and air fuel ratio enriching or leaning control is not inhibited.

The foregoing description has been made by using proportional and integral calculations for air fuel ratio feedback control, but even in any method in which air fuel ratio feedback control is performed based on the air fuel ratio AF from the oxygen concentration sensor 29, the alcohol concentration AL can be estimated by the use of the air fuel ratio correction coefficient KFB, so similar effects can be achieved.

Further, the oxygen concentration sensor 29 need only be a sensor that can detect the air fuel ratio of the exhaust gas, and hence, even with the use of a linear type air fuel ratio sensor, a NOx sensor, an HC sensor, a CO sensor, and so on, air fuel ratio feedback control can be carried out, and the alcohol concentration AL can be estimated. Thus, in such cases, similar effects can be achieved.

While the invention has been described in terms of preferred embodiments, those skilled in the art will recognize that the invention can be practiced with modifications within the spirit and scope of the appended claims.

What is claimed is:

1. A control apparatus for an internal combustion engine, comprising:
    a fuel supply device that supplies fuel in a fuel tank to said internal combustion engine;
    an air fuel ratio detection unit that is arranged in an exhaust system of said internal combustion engine for detecting an air fuel ratio in an exhaust gas from said internal combustion engine;
    an air fuel ratio correction amount calculation unit that calculates an amount of air fuel ratio correction for correcting an amount of injection fuel supplied to said internal combustion engine based on the air fuel ratio detected by said air fuel ratio detection unit;
    an estimation permission determination unit that makes a determination that a starting condition for estimation of a concentration of said fuel holds when said air fuel ratio correction amount becomes out of a range of a predetermined threshold, and sets a permission time for said concentration estimation in accordance with a first accumulated amount of injection fuel which is obtained by summing said amount of injection fuel supplied to said internal combustion engine after said starting condition for concentration estimation holds;
    a concentration estimation unit that calculates the estimated value of a concentration of a single component of said fuel based on said air fuel ratio correction amount during the time when said concentration estimation is permitted by said estimation permission determination unit; and
    a fuel injection amount calculation unit that corrects said amount of fuel to be injected in accordance with said air fuel ratio correction amount and said estimated concentration value.

2. The control apparatus for an internal combustion engine as set forth in claim 1,
    wherein said concentration estimation unit updates said estimated concentration value based on said air fuel ratio correction amount and a control constant, and variably sets said control constant in accordance with said first accumulated amount of injection fuel.

3. The control apparatus for an internal combustion engine as set forth in claim 1,
    wherein said fuel supply device includes:
    a canister that adsorbs a vaporized gas generated from said fuel in said fuel tank; and
    a purge opening and closing unit that introduces said vaporized gas adsorbed by said canister into said internal combustion engine; and
    wherein said estimation permission determination unit sets a purge inhibition period for inhibiting said purge opening and closing unit from being opened in accordance with said first accumulated amount of injection fuel.

4. The control apparatus for an internal combustion engine as set forth in claim 1,
    wherein said fuel supply device includes:
    a canister that adsorbs a vaporized gas generated from said fuel in said fuel tank; and
    a purge opening and closing unit that introduces said vaporized gas adsorbed by said canister into said internal combustion engine; and
    wherein said estimation permission determination unit sets a period for determining whether said starting condition for concentration estimation holds, as a purge inhibition period for inhibiting said purge opening and closing unit from being opened.

5. The control apparatus for an internal combustion engine as set forth in claim 1,
    wherein said air fuel ratio correction amount calculation unit includes a learning correction unit that corrects said amount of injection fuel by using a learning correction coefficient that has been updated by applying filter processing or averaging processing to said air fuel ratio correction amount;
    wherein said estimation permission determination unit includes a learning value update inhibition period setting unit that sets an update inhibition period for inhibiting the update of said learning correction coefficient; and
    wherein said learning value update inhibition period setting unit sets, as said update inhibition period, a period for determining whether said starting condition for concentration estimation holds and a period in which said first accumulated amount of injection fuel indicates a value equal to or less than a first predetermined amount.

6. The control apparatus for an internal combustion engine as set forth in claim 1,
    wherein said estimation permission determination unit resets said learning correction coefficient to a predetermined value when the starting condition for concentration estimation holds.

7. The control apparatus for an internal combustion engine as set forth in claim 1,
    wherein said estimation permission determination unit makes a determination that said starting condition for concentration estimation holds, when a second accumulated amount of injection fuel, which is obtained by summing amounts of fuel injected in periods in which said air fuel ratio correction amount becomes out of the range of said predetermined threshold, reaches a second predetermined amount.

8. The control apparatus for an internal combustion engine as set forth in claim 1,
wherein said estimation permission determination unit variably sets said predetermined threshold in accordance with a third accumulated amount of injection fuel which is obtained by summing amounts of fuel injected after refueling of said fuel tank.

9. The control apparatus for an internal combustion engine as set forth in claim 1,
wherein said estimation permission determination unit sets a control stop inhibition period for not stopping the calculation of said air fuel ratio correction amount in said air fuel ratio correction amount calculation unit in accordance with said first accumulated amount of injection fuel.

10. The control apparatus for an internal combustion engine as set forth in claim 1,
wherein said estimation permission determination unit sets a period for determining whether said starting condition for concentration estimation holds, in accordance with a third accumulated amount of injection fuel which is obtained by summing amounts of fuel injected after refueling of said fuel tank.

* * * * *